(12) United States Patent
Brave et al.

(10) Patent No.: US 7,693,836 B2
(45) Date of Patent: *Apr. 6, 2010

(54) METHOD AND APPARATUS FOR DETERMINING PEER GROUPS BASED UPON OBSERVED USAGE PATTERNS

(75) Inventors: Scott Brave, Mountain View, CA (US);
Robert Bradshaw, San Jose, CA (US);
Jack Jia, Los Altos Hills, CA (US);
Christopher Minson, Menlo Park, CA (US)

(73) Assignee: Baynote, Inc., Cupertino, CA (US)

( * ) Notice: Subject to any disclaimer, the term of this patent is extended or adjusted under 35 U.S.C. 154(b) by 334 days.

This patent is subject to a terminal disclaimer.

(21) Appl. No.: 11/350,428

(22) Filed: Feb. 8, 2006

(65) Prior Publication Data

US 2007/0150470 A1    Jun. 28, 2007

Related U.S. Application Data

(62) Division of application No. 11/319,928, filed on Dec. 27, 2005.

(51) Int. Cl.
*G06F 17/30* (2006.01)
(52) U.S. Cl. .............................. 707/6; 709/224; 715/205
(58) Field of Classification Search .................. 707/3, 707/6; 709/224; 715/205
See application file for complete search history.

(56) References Cited

U.S. PATENT DOCUMENTS

| 5,867,799 A | 2/1999 | Lang et al. |
| 5,890,149 A | 3/1999 | Schmonsees |
| 5,924,105 A | 7/1999 | Punch, III et al. |
| 5,983,214 A | 11/1999 | Lang et al. |
| 6,016,475 A * | 1/2000 | Miller et al. .................. 705/1 |

(Continued)

FOREIGN PATENT DOCUMENTS

CN         1096038 C       12/2002

(Continued)

OTHER PUBLICATIONS

Almeida. "A Community Aware Search Engine," ACM, May 2004, pp. 413-421.*

(Continued)

*Primary Examiner*—Shahid A Alam
*Assistant Examiner*—Alexandria Y Bromell
(74) *Attorney, Agent, or Firm*—Orrick, Herrington & Sutcliffe, LLP

(57) ABSTRACT

The invention comprises a set of complementary techniques that dramatically improve enterprise search and navigation results. The core of the invention is an expertise or knowledge index, called UseRank that tracks the behavior of website visitors. The expertise-index is designed to focus on the four key discoveries of enterprise attributes: Subject Authority, Work Patterns, Content Freshness, and Group Know-how. The invention produces useful, timely, cross-application, expertise-based search and navigation results. In contrast, traditional Information Retrieval technologies such as inverted index, NLP, or taxonomy tackle the same problem with an opposite set of attributes than what the enterprise needs: Content Population, Word Patterns, Content Existence, and Statistical Trends. Overall, the invention encompasses Baynote Search—a enhancement over existing IR searches, Baynote Guide—a set of community-driven navigations, and Baynote Insights—aggregated views of visitor interests and trends and content gaps.

20 Claims, 12 Drawing Sheets

U.S. PATENT DOCUMENTS

| | | | |
|---|---|---|---|
| 6,041,311 A * | 3/2000 | Chislenko et al. | 705/27 |
| 6,049,777 A * | 4/2000 | Sheena et al. | 705/10 |
| 6,070,133 A | 5/2000 | Brewster et al. | |
| 6,112,186 A * | 8/2000 | Bergh et al. | 705/10 |
| 6,240,407 B1 | 5/2001 | Chang et al. | |
| 6,334,124 B1 | 12/2001 | Bouchard et al. | |
| 6,418,448 B1 | 7/2002 | Sarkar | |
| 6,438,579 B1 * | 8/2002 | Hosken | 709/203 |
| 6,493,703 B1 | 12/2002 | Knight et al. | |
| 6,502,091 B1 * | 12/2002 | Chundi et al. | 707/3 |
| 6,687,696 B2 * | 2/2004 | Hofmann et al. | 707/6 |
| 6,839,680 B1 | 1/2005 | Liu et al. | |
| 6,842,877 B2 * | 1/2005 | Robarts et al. | 715/708 |
| 6,938,035 B2 * | 8/2005 | Driesch et al. | 707/3 |
| 6,943,877 B2 * | 9/2005 | Diehr et al. | 356/240.1 |
| 7,031,961 B2 * | 4/2006 | Pitkow et al. | 707/4 |
| 7,092,936 B1 * | 8/2006 | Alonso et al. | 707/3 |
| 7,093,012 B2 | 8/2006 | Olstad et al. | |
| 7,162,473 B2 * | 1/2007 | Dumais et al. | 707/5 |
| 7,203,909 B1 * | 4/2007 | Horvitz et al. | 715/765 |
| 7,343,365 B2 * | 3/2008 | Farnham et al. | 707/1 |
| 2001/0018698 A1 * | 8/2001 | Uchino et al. | 707/533 |
| 2002/0078091 A1 | 6/2002 | Vu et al. | |
| 2002/0082901 A1 * | 6/2002 | Dunning et al. | 705/10 |
| 2002/0103698 A1 * | 8/2002 | Cantrell | 705/14 |
| 2002/0103789 A1 * | 8/2002 | Turnbull et al. | 707/3 |
| 2002/0116421 A1 | 8/2002 | Fox et al. | |
| 2002/0199009 A1 | 12/2002 | Willner et al. | |
| 2003/0004996 A1 | 1/2003 | Novaes | |
| 2003/0005053 A1 | 1/2003 | Novaes | |
| 2003/0172075 A1 | 9/2003 | Reisman | |
| 2004/0039630 A1 | 2/2004 | Begole et al. | |
| 2004/0088276 A1 | 5/2004 | Elder et al. | |
| 2004/0088312 A1 | 5/2004 | Elder et al. | |
| 2004/0088315 A1 | 5/2004 | Elder et al. | |
| 2004/0088322 A1 | 5/2004 | Elder et al. | |
| 2004/0088323 A1 | 5/2004 | Elder et al. | |
| 2004/0088325 A1 | 5/2004 | Elder et al. | |
| 2004/0117222 A1 * | 6/2004 | Rokosz et al. | 705/7 |
| 2004/0230572 A1 | 11/2004 | Omoigui | |
| 2004/0263639 A1 | 12/2004 | Sadovsky et al. | |
| 2005/0060312 A1 | 3/2005 | Curtiss et al. | |
| 2005/0108630 A1 | 5/2005 | Wasson et al. | |
| 2005/0165805 A1 | 7/2005 | Novaes | |
| 2006/0200556 A1 | 9/2006 | Brave et al. | |
| 2006/0259344 A1 | 11/2006 | Patel et al. | |
| 2007/0043609 A1 * | 2/2007 | Imam et al. | 705/11 |
| 2007/0150465 A1 * | 6/2007 | Brave et al. | 707/5 |
| 2007/0150466 A1 | 6/2007 | Brave et al. | |
| 2007/0150515 A1 | 6/2007 | Brave et al. | |
| 2007/0150646 A1 | 6/2007 | Brave et al. | |
| 2007/0255735 A1 * | 11/2007 | Taylor et al. | 707/100 |
| 2008/0040314 A1 | 2/2008 | Brave et al. | |
| 2008/0104004 A1 | 5/2008 | Brave et al. | |
| 2009/0037355 A1 | 2/2009 | Brave et al. | |

FOREIGN PATENT DOCUMENTS

| | | |
|---|---|---|
| CN | 1527976 A | 9/2004 |
| EP | 05855746.3 | 12/2009 |
| WO | WO 01/93076 A2 | 12/2001 |
| WO | WO 02/08950 A2 | 1/2002 |
| WO | WO 2004/075466 A2 | 9/2004 |
| WO | WO 2005/029368 A1 | 3/2005 |
| WO | WO 2005/052727 A2 | 6/2005 |
| WO | WO 2006/071931 A2 | 7/2006 |

OTHER PUBLICATIONS

Almeida, Rodrigo B. et al., "A Community Aware Search Engine," ACM, May 2004, pp. 413-421.*
Almeida, Rodrigo. "A Community Aware Search Engine," ACM, May 2004, pp. 413 - 421.*
Office Action for U.S. Appl. No. 11/350,668, issued Oct. 16, 2008.*
Office Action for U.S. Appl. No. 11/350,904, issued Apr. 28, 2009.*
Notice of Allowance for U.S. Appl. No. 11/350,428 issued Sep. 30, 2009.*
Notice of Allowance for U.S. Appl. No. 11/350,668 issued Feb. 6, 2009.*
Alton - Sheidl et al. "Select Social and Collaborative Filtering of Web Documents and News," Proceedings of ERCIM Workshop on User Interfaces for All: User Tailored Information Environments. Nov. 28, 1999.*
Paepcke et al. "Beyond Document Similarity: Understanding Value - Based Search and Browsing Technologies," ACM. Mar. 1, 2000. pp. 80 - 92.*
Almeida, R.B. et al.; A Community-Aware Search Engine; Department of Computer Science, Universidade Federal de Minas Gerais, Belo Horizonte, MG, Brazil; 2004.
Boyan, J. et al.; A Machine Learning Architecture for Optimizing Web Search Engines; AAAI Workshop on Internet-Based Information Systems, Portland, Oregon, 1996.
Joachims, T. et al.; WebWatcher: A Tour Guide for the World Wide Web; School of Computer Science, Carnegie Mellon University, Pittsburg, PA; Sep. 1996.
Ian Ruthven et al.; Selective Relevance Feedback Using Term Characteristics; Department of Computing Science, University of Glasgow, Scotland; 1999.
Vogt, C.C. et al.; Using Relevance to Train a Linear Mixture of Experts; Computer Science and Engineering 0114, University of California, San Diego; 1997.
Pohle, C. et al.; Building and Exploiting Ad-Hoc Concept Hierarchies for Web Log Analysis; Data Warehousing and Knowledge Discovery. 4th International Conference, DaWaK 2002. Proceedings (Lecture Notes in Computer Science vol. 2454) p. 83-93; Springer-Verlag, Berlin, Germany; 2002.
Hammer, M. et al.; Acquisition and Utilization of Access Patterns in Relational Data Base Implementation; 1976 Joint Workshop on Pattern Recognition and Artificial Intelligence p. 14; IEEE, New York, NY, USA; 1976.
Drogan, M. et al.; Extracting Riches from the Web: Web Mining/ Personalization; SCI 2003. 7th World Multiconference on Systemics, Cybernetics and Informatics Proceedings vol. 16 p. 214-19; IIIS; Orlando, FL, USA; 2003.
Dean, J. et al.; Finding Related Pages in the World-Wide Web; Computer Networks vol. 31, No. 11-16 p. 1467-79; Elsevier; May 17, 1999; Netherlands.
Weideman, M. et al.; The Effect of Search Engine Keyword Choice and Demographic Features on Internet Searching Success; Information Technology and Libraries, 23, 2, 58(8); Jun. 2004.
Graham, P., et al. A Mechanism for the Dynamic Construction of Clusters Using Active Networks. Proceedings International conference on Parallel Processing Workshops. IEEE Comput. Soc. Los Alamitos, CA. 2001.
Zhao, D.G. Usage Statistics Collection and Management in the ELINOR Electronic Library. Journal of Information Science. vol. 21. No. 1 p. 1-9. 1995 U.K.
Osman, I.M. Matching Storage Organization to Usage Pattern in Relational Data Bases. Univ. Durham, U.K. 1974.
Iamnitchi, A.I. Resource Discovery in Large Resource-Sharing Environments. The University of Chicago. 2003. vol. 6410B of Dissertations Abstracts International. p. 5035.
Arpaci-Dusseau, A.C. Implicit Coscheduling Coordinated Scheduling with Implicity Information in Distributed Systems. ACM Transactions on Computer Systems, 19, 3, 283. Aug. 2001.
Asakawa, K., et al. Neural Networks in Japan. (Artificial Intelligence)(Cover Story)(Technical). Communications of the ACM, v37. n3. p. 106(7). Mar. 1994.
De Meo, P., et al. An XML-Based Adaptive Multi-Agent System for Handling E-Commerce Activities. M. Jeckle and L.-J Zhang. ICWS-Europe 2003. LNCS 2853. p. 152-166.
Chan, P.K. A Non-Invasive LEarning Approach to Building Web User Profiles. KDD-00 Workshop on Web Usage Analysis and User Profiling. 1999.

Ruthven, I. Incorporating Aspects of Information Use into Relevance Feedback. Journal of Information Retrieval. 2, 1-5. Kluwer Academic Publishers, Boston. 1992.

Ferguson, I.A. et al.; Multiagent Learning and Adaptation in an Information Filtering Market; Interactive Information Group, Institute for Information Technology, National Research Council; Ottawa ON, Canada; 1996.

Ianni, G.; Intelligent Anticipated Exploration of Web Sites; INFSYS Research Report 1843-01-09; Oct. 9, 2001; Austria.

Jameson, A.; User-Adaptive and Other Smart Adaptive Systems: Possible Synergies; Proceedings of the First EUNITE Symposium, Tenerife, Dec. 13-14, 2001.

Freeberg, Davis, "Will Lycos Settle Claims Against Tivo, Blockbuster & Netflix Out of Court?" Aug. 16, 2007, http://media.seekingalpha.com/article/44627.

U.S. Appl. No. 11/874,157, Office Action, Mar. 18, 2009.
U.S. Appl. No. 11/350,646, Office Action, Mar. 31, 2008.
U.S. Appl. No. 11/319,928, Office Action, Mar. 4, 2009.
U.S. Appl. No. 11/319,928, Office Action, Jul. 23, 2008.
U.S. Appl. No. 11/874,137, Office Action, Apr. 2, 2009.
U.S. Appl. No. 11/351,143, Office Action, Mar. 28, 2009.
U.S. Appl. No. 11/351,143, Office Action, Nov. 25, 2008.
U.S. Appl. No. 11/351,143, Notice of Allowance, Sep. 8, 2009.
U.S. Appl. No. 11/350,668, Office Action, Apr. 30, 2008.
U.S. Appl. No. 11/350,668, Office Action, Oct. 16, 2008.
U.S. Appl. No. 11/350,668, Notice of Allowance, Feb. 6, 2009.
U.S. Appl. No. 11/350,904, Office Action, Apr. 29, 2008.
U.S. Appl. No. 11/350,904, Restriction Requirement, Nov. 26, 2008.
U.S. Appl. No. 11/350,904, Office Action, Mar. 31, 2009.
PCT/US08/72660 Search Report, Nov. 6, 2008.
PCT/US2005/47235 Search Report, Dec. 28, 2005.

Alton-Scheidl R. et al "Select: Social and Collaborative Filter of Web Documents and News" Proceedings of the ERCIM Workshop on User Interfaces for All User-Tailored Information Environments, XX, XX, Nov. 28, 1999.

Paepcke, A. et al: "Beyond Document Similarity: Understanding Value-Based Search and Browsing Technologies" Sigmod Record, ACM, New York, NY, US, vl. 29, No. 1, Mar. 1, 2000 pp. 80-92.

* cited by examiner

WCI Extranet Portal

My Library • Logout • Help

My Library for Dave | WCI Chip 3 Timing | Search | Advanced | Sep. 15, 2004

*My Collections* / *Peer Collections* / *Expert Collections*

Content I Can Modify [edit]

Dave PC> My documents > Wireless Products
- Airwave Product Executive Preso
- G10 phone design spec v5.0
- Remote DVD design spec v2.1

Airwave Email Server Archive > Dave Email > Critical
- Design Alerts

Airwave WCM Server > Dave WA > My Published
- G5 Installation

Airwave DM srever > Consumer Products
- Remove DVD system layout v11

My Top 10
My Most Recently Used
My Highly Ranked

Content I Can View [edit]

Airwave > Products > G10 Phone
- MRDs
- Engineering Schedule
- Old Design Document v7.2

WCI > Support!
- Customer Faq
- Training Books
- Developer Network

Cadence.com > Products > Custom IC
- System-on-Chip Solution
- Wireless Design Platform
- Analog-Digital Mixed Signal Tools IEEE.org > Working Groups
- 802.11 standards My Top 10
My Most Recently Used
My Highly Ranked

[Add Content] [WCI->Engineering->Garnesh->Project Nova Timing Workaround.txt] [Browse PC] [Browse Web] [Browse Apps]

*FIG. 9*

WCI Extranet Portal — My Library • Logout • Help

My Library for Dave | WCI Chip 3 Timing | Search | Advanced | Sep. 15, 2004

My Collections / Peer Collections / Expert Collections

**Content From My *Trusted Experts*** [edit] ☐ ✕

WCI > Sales > Sam
- WCI Corporate Update Q3 2004
- WCI Product Technical Presentation
- WCI Chip 2 Data Book
- WCI Chip 3 Data Book
- WCI Chip 4 Data Book WCI > Marketing > Mark
- WCI Chip 5 White papers
- WCI Chip 3 data sheets WCI Sales Top 10
WCI Sales Recent Used
WCI Sales Highly Ranked Organize My Experts (Dependency, Layout, Filter and Rule)

**Content From My *Indirect Experts*** [edit] ☐ ✕

WCI > Engineering > Ganesh
- Chip 3 Inside Edition
- FAQ Folder
- Public Design Docs WCI > Marketing > Tina
- Training Materials
- WCI Corp. Presentation WCI MKT Top 10
WCI MKT Recent Used
WCI MKT Highly Ranked WCI ENG Top 10
WCI ENG Recent Used
WCI ENG Highly Ranked My Expert Network Map

*FIG. 10*

| WCI Extranet Portal | | | | | My Library • Logout • Help |
|---|---|---|---|---|---|
| My Library for Dave | WCI Chip 3 Timing | Search | Advanced | | Sep. 15, 2004 |

My Collections / Peer Collections / Expert Collections

Dave's Peer and Expert Network

| Name | Dept | Peer | Expert | Indirect Expert Depth | Ranking | Content Threshold | R/W |
|---|---|---|---|---|---|---|---|
| Doug | Design | X | | 1 | 2 | 50 | R/W |
| Mark | MKT | | X | 1 | 3 | 50 | R/W |
| Sam | Sales | | X | 1 | 1 | 100 | R |
| Steve | Design | X | | 1 | 1 | 20 | R/W |

Add     Show Indirect Experts     Restore to Default

Organize My Experts (Dependency, Layout, Filter and Rule)     My Expert Network Map

*FIG. 11*

METHOD AND APPARATUS FOR DETERMINING PEER GROUPS BASED UPON OBSERVED USAGE PATTERNS

CROSS-REFERENCE TO RELATED APPLICATIONS

This application is a divisional of U.S. Ser. No. 11/319,928 filed 27 Dec. 2005.

BACKGROUND OF THE INVENTION

1. Technical Field

The invention relates to electronic access to information. More particularly, the invention relates to a method and apparatus for identifying, extracting, capturing, and leveraging expertise and knowledge.

2. Description of the Prior Art

For years enterprises have struggled with ineffective search techniques. Compared to what is available on the public Web via services such as Google and Yahoo, there remains a dearth of highly relevant search solutions for content within the enterprise. With dozens to hundreds of independent application and repository information silos in each company, finding critical business information costs business hundreds of billions of dollars each year [source: A. T. Kearney]. Today, CIOs and business executives are revisiting enterprise search as one of the top business/IT challenges for the next few years.

Enterprise search needs are poorly served. Various search technologies have been developed to attack the challenge of searching the Web, searching individual user's computers (PC/desktop), and searching the internal business documents (enterprise). Each of these approaches are unique, but none provide an adequate solution for the enterprise.

PC (Desktop) Search

PC or desktop search can be compared with finding stuff in your messy garage. You know you have it somewhere but just cannot find it. So to locate is the only goal. And when you do find it, you are the sole judge to decide if you have indeed found the right content or document because you collected or wrote the content in the first place. You are the only expert and authority that matters.

Traditional PC search from Microsoft is based on parsing a file at the time of search. It is slow and can only find things in isolated places, such as file folders or email directories. The latest PC search introduces inverted index technology from Google, soon to be available also from Yahoo, Ask Jeeves, and Microsoft. They start to solve the speed and silo problems so that users can find information across personal file systems, Outlook or email systems, calendars, and other desktop environment.

Web Search

The other spectrum of the search is Web search. There, the story is more like driving in Boston for the first time. You are not necessarily the expert of the topics you are looking for and you are learning a new subject. Sometimes, you search to find new services such as weather, travel, or shopping. With Web search, you are counting on millions of people on the Web to help you and you do not necessarily know or care who is the real expert or authority. As a result, you sometimes get bad advice or may shop in the wrong places.

Web search before Google relied only on technologies such as inverted indexes, natural language processing (NLP), and database indexes. They were OK but not as good as it could be if counted the number of links that point at a page. As more sites link to your page, your page becomes more important, simply because webmasters behind the sites have gone through the trouble of adding those extra links to your page. Hence, the birth of page-ranking[tm] and the success of Google's business.

Enterprise Search

The enterprise, however, does not behave as the PC or the Web environment. Imagine you are looking for books to learn Java programming—you know your ultimate goal but there are hundreds of books about Java, which one should I read: it has to be exactly right. So a discovery process finds the right reference content, or information known by other experts in the company. The ultimate judge of good search results for an enterprise extends beyond just yourself. These arbiters of good results could be your peers or the experts that you depend on to do your job.

An example of the problem with enterprise search is shown in FIG. 1, which is a flow diagram showing the state of the art in enterprise search. In the example of FIG. 1, Dave is searching for particular information and retrieves 2,800 documents. There is no useful result that Dave found in the top ten results returned so, Dave calls Sam. Sam, in turn, searches and, finding nothing, e-mails marketing. Mark and Tina in marketing search and find nothing as well. Mark calls Eric, Nancy, and Ganesh and the answer is found in Ganesh's design document. Tina calls Eric, Nancy, and Ganesh again and everybody is now upset. Clearly, it would have been more useful for Dave if he had found Ganesh's design document in his initial search. In fact, the document may have been there but among the 2,800 documents located, but it was not possible for Dave to identify the most useful document.

Traditional enterprise search technology uses inverted index, NLP, and database index approaches (see FIG. 2). The major problem is that the current engine throws hundreds to thousands of search results per query back to the user. Anything that looks like Java or programming, is all mixed together for you to see. Much like email spam, search engines spam the user with numerous, out-of-date, irrelevant, unofficial, siloed, contradictory, and unauthorized results. Users give up quickly and resort to much more expensive ways to get the information including calling, emailing, chafting, or worse, starting to recreate, make up, or give up on the information that already exists.

Enterprise Search Exhibits a Unique Set of Characteristics

By comparing the key issues in enterprise search with that of Web or PC search, it can be concluded that enterprise search is unique and in direct contrast to Web search. In fact, what works for Web search does not and will not work for enterprise search, and vice versa. Five key attributes are considered in this regard: search guide, user behavior, freshness and credibility of the content, user homogeneity, and privacy concerns.

Primary Guide

On the Web, for example, Google's success has depended on page ranking as the primary guide. While page ranking has been effective to provide some sanity in the Web, the same effect will not happen for enterprise content search. Firstly, enterprise content lacks the large number of links needed to provide the page ranking guiding effect, nor are there incentives for enterprises to create these links on a sustainable basis. Secondly, the real goal of page ranking is to find the traces of human effort to indicate subject authority indirectly because it is next to impossible to find the real experts in the vast universe of the Web. For enterprises, you should not need to guess indirectly who might be the experts, you know who the trusted experts are, you hire them, and they work day in and day out in the company as specialists in their domain areas. Enterprise search should rely on them as subject authorities for relevant guidance and ranking.

User Behavior

User behavior is completely different between the enterprises and the Web. We as individuals on the Web have more faces than we might know. We could be men, fathers, sons, husbands, brothers, golfers, travelers, rock musicians, investors, and hundreds of other profiles all at the same time. When we search on the Web, the search tends to be one-off and all over the place. Also, the keywords we type in tend to be the search goals themselves. When we type in "weather," we are looking for weather information. User feedback on the Web is not reliable because only a very small group of loud users have the time to give feedback and therefore skews the search results with their non-representative bias (how does this last sentence connects to the rest of the paragraph? Perhaps build a short paragraph that explains the bias in user feedback).

Enterprise search, however, tends to repeat itself quickly based on the user's role and the situations he is in. When one sales person is looking for some sales collateral, other sales people responsible for the same products in the same region are very likely in need of the same information. Equally important is the fact that this person who may have 300 roles and profiles in their personal life, has a much smaller number of work roles, e.g. a half dozen at most. He might be an engineer, working in the Paris office while he is a member of the cross-functional cultural committee. It is also important to note that the keywords in the enterprise searches are more like hints, even fishing bait, to documents a person is looking for. It is thought that eighty percent of people seek information they have seen before. Given the enterprise user predictability, we can safely rely on self-motivated actions and behaviors to collect unbiased feedback.

Freshness and Credibility

Web search rewards or ranks older content higher. The longer the content has been sitting there, the more likely it will be found because it has time for others to discover and link to this piece of content.

Enterprises want to behave differently. Fresh content reflects new business situations and, therefore, must be ranked higher so that more people see it. By responding to fresh content quickly, business agility is assured. A piece of content that is one week old may be better than one that is a year old, except that it is not good at all if today's content is available and shows something different than the one week old content. Enterprise search users do not want good enough content, they require the search result to be exactly right.

Homogeneity

The Web or consumer world is very heterogeneous, while an enterprise is the opposite: homogeneous, or more precisely, segmented homogeneous, meaning that different departments or groups (sales vs. marketing vs. engineering) in a company might be different (segmented), but within a group, people are very similar or homogeneous in the way they work regardless how different their profiles are.

The implication of this splitting attributes is profound. In a large heterogeneous world with millions of people involved, statistics is the only known technique to approach the problem in the effort of understanding what people like, want, etc. Web search relies on statistics correctly to find not-so-precise information for the users. The enterprise again is different. With small sample populations and homogeneous groups, statistics do not work. To understand them, you need to know their likes and dislikes. No predictions (what do we mean by 'predictions'?), just awareness.

With this understanding of enterprise characteristics, it is seen that enterprise search needs to focus on subject authorities, repeated role-based work patterns, fresh and official content, and group know-how (a group's collective knowledge and expertise to do a job). Re-examining traditional IR-based (information retrieval) search, we realize that it focuses on the opposite. It relies on the whole content population (crawl and index it) instead of subject authorities, word or linguistic patterns instead of work patterns, older existing content instead of fresh or official content, statistical trends to predict instead of group similarity to know. There is thus a need for techniques that focus on the correct key characteristics of the enterprises.

The problem with enterprise search technology has become acute to many CIO's and business executives. In the inventor's own limited surveys of a dozen CIOs and business executives, people ranked the enterprise search priority problem as a 9-10 out of 10. The challenge of traditional full-text engines is poor relevancy. They are good for everything (all content) and good for nothing (irrelevant results) at the same time. The NLP technology achieves better relevancy by focusing on one application and one domain where human language becomes more deterministic. The problem with the NLP is that the solution is placed in a silo and good only within that specific application, while enterprises are operating on hundreds to thousands of applications. It is not possible for employees to log on to these many systems one by one to look for information. Both classes of solutions also suffer from the inability to adapt to changes once deployed. Taxonomies and structures change quickly over time in enterprises.

Current search software also suffers from traditional enterprise model with inherited expensive product architecture, design and marketing and sales model. A typical enterprise search deployment costs $500K to several millions after considering software licenses, services, training, and other related costs.

It would therefore be advantageous to transform how enterprise search technologies are bought and deployed with an improvement on cost and quality of search.

SUMMARY OF THE INVENTION

The invention addresses the above limitations of state of the art enterprise search by leveraging what should be depended on for enterprise search: one's peers and experts in and out of the company. The invention provides systems that identify, extract, analyze, and use the expertise ranking to produce personalized, precise search results to the user so that they do not have to call, email, etc.

The inventors have discovered a set of unique approaches to enterprise search that is different from all existing IR (information retrieval) based solutions, such as Verity, Autonomy, FAST, Endeca, and Google Appliance. The inventors carefully analyzed the characteristics of enterprises in contrast to the Web search environment, and applied a set of methodologies in related disciplines from technology development, academic research, and social behavior. The invention provides a technique that can work standalone or embed itself in other applications via a plug-n-play interface with minimum effort. The result is a huge improvement in search usefulness, relevancy, search federation across applications, and cost savings. The preferred embodiment of the invention also leverages traditional search technologies.

The invention provides relevant information discovery by taking a completely opposite approach to that of traditional search theories and technologies. As discussed above, traditional content search technology and products use content as the basis for guiding searches. It employs techniques such as information retrieval (IR) algorithms, natural language processing (NLP) techniques and rules, product or structural taxonomy, or page ranking by link count. Traditional data search relies on building database indexes on key words or numbers in database rows or columns. It crawls and indexes the content and data, generates inverted full-text indexes or database indexes with word tokens or phrases, potentially assisted by taxonomy and paging ranking for improving search results. The search results using traditional search technology are poor, with large amounts of low-relevancy hits. For many business processes, when a search fails, users have to resort to alternative, expensive ways of acquiring information that either take a significant amount of time for the user, or worse yet, involves others to help find the information (see FIG. 1).

Instead of using content as the starting point for information discovery, the invention provides a system that starts with the people in and around enterprises. After all, enterprises are made of specialists and experts possessing expertise and know-how. They conduct work and repeat their work patterns frequently on a role-by-role basis. The system detects and captures the expertise and work patterns stored in people's brains and exhibited in their daily behavior, and creates a behavioral based knowledge index. The knowledge index is then, in turn, used to produce expert-guided, personalized information. This process is transparent to the experts themselves, and therefore efficient and extremely economical to employ.

BRIEF DESCRIPTION OF THE DRAWINGS

FIG. 9 is a screen shot showing a user library according to the invention;

FIG. 10 is a second screen shot showing a user library according to the invention;

FIG. 11 is a third screen shot showing a user library according to the invention;

DETAILED DESCRIPTION OF THE INVENTION

Figure 1:
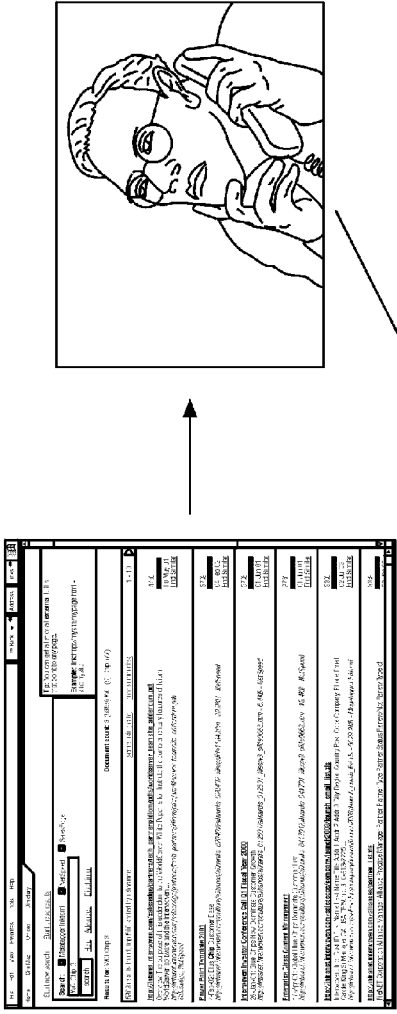
FIG. 1 is a flow diagram showing the current state of the art in enterprise search.
Figure 2:
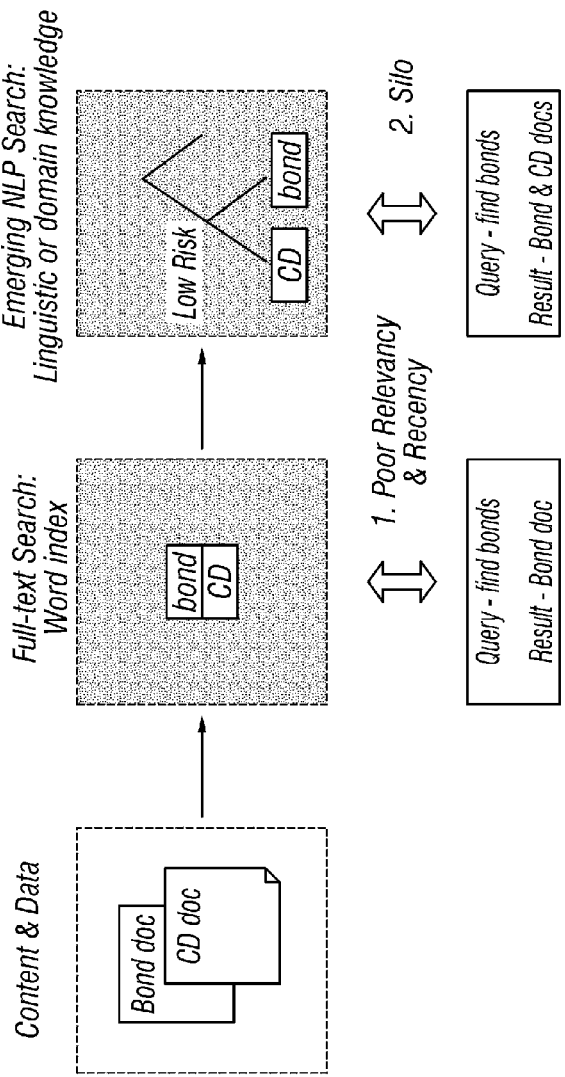
FIG. 2 is a flow diagram showing traditional IR-based search models.

Using Expertise and Behavior for Information Discovery

The invention comprises a set of complementary techniques that dramatically improve enterprise search and navigation results. The core of the invention is an expertise or knowledge index, also referred to as an expertise repository, that makes observations of website and web application visitors. The expertise-index is designed to focus on the four key discoveries of enterprise search: Subject Authority, Work Patterns, Content Freshness, and Group Know-how. The invention produces relevant, timely, cross-application, expertise-based search results. In contrast, traditional Information Retrieval technologies such as inverted index, NLP, or taxonomy tackle the same problem with an opposite set of attributes than what the enterprise needs: Content Population, Word Patterns, Content Existence, and Statistical Trends.

A further embodiment of the invention makes the novel technology work within existing an enterprise application and repository environment transparently so that no user training or adoption of new interfaces is required. It also supports all legacy full-text or NLP search technologies, such as Verity, Autonomy, Endeca, and the Google Appliance. In fact, it works on top of those technologies and uses their base result as a foundation for refinement.

A third embodiment of the invention comes from leveraging open source technology, such as Lucene, for building a scalable network query engine that binds all dimensions of the information source and indexes into one set of meaningful results.

Embeds in Application UI to Capture Behavioral Relevancy

The invention embeds itself in any existing Web applications such as www, CRM, ERP, and portals etc. via a simple change to the search results interface. For non-Web applications, similar work can be done by inserting SOA (service-oriented architecture) stub code so that search traffic can be inspected and re-ranked by an expertise index. Further, any web page, not just search results pages, can be configured with the invention to provide active guidance to the user without requiring the user to enter a query.

Reliance on Self-Interest

The invention does not require users to explicitly vote, provide feedback, or utilize other mechanisms that commonly result in collaborative filtering. It relies on people doing their normal jobs selfishly and leaving a trail of evidence of what they need and prefer to get their job done. The reliance on selfishness is fundamentally different and far more reliable guidance than the traditional collaborative filtering, where users are instructed to vote for other people. When users are asked to give feedback, most people do not do it because they lack time or it is not a priority. When forced, people check boxes quickly without thinking and, therefore, mislead people who use the data. There is a small group of people who do like to fill out surveys and give feedback, but often times they are the vocal, critical, and least representative samples of the user population. Both Amazon and eBay have negative experiences in using traditional collaborative filtering techniques to accomplish ranking by similarity.

Implicit Relevance Actions

The invention allows application-by-application configuration of user action tracking. Implicit action buttons (discussed below) are embedded as part of the search results to capture critical cues of user intention and preferences as the users do their job. For example, a common portal may give users "view," "download," "print," and "email" buttons as the actions to reflect their intention when discovering relevant content. "View" might be a weaker indication, while the others are strong indications of preference. The invention develops additional implicit observations that predict visitor intentions with strong confidence. These observations include the ability to detect think time, virtual bookmarks, virtual print and virtual email. In all cases, visitors have not performed a bookmark, print, or email against the content, but they keep the content up on the computer screen for a long time, i.e long enough to use the content as a reference for work. These observations are cross checked among peers and experts before they truly become useful for the community.

Explicit Relevance Actions

At least two additional explicit buttons can be added to track clear cues of user behavior. "Save to library" indicates a strong, explicit endorsement of content given the query, while "remove" or "demote" indicates strong dislike of the content given a query and a role. The library is virtual and does not physically live on a browser or even on the PC. It is the main user behavior tracking object or a journal. Again, explicit relevance ranks higher than implicit relevance, but both are managed under one per-user library object.

Search Spam Control

People are familiar with email spam. Current search exhibit similar behaviors to spam, with thousands, if not tens of thousands of results returned in response to a simple query, and many of the results are totally irrelevant to what the users are looking for. Through the use of the "remove" action after considering the role an employee is playing, the inventive system can identify and demote results that are less relevant or irrelevant to a group of users of the same role, in a manner that is analogous to the spam email reporting scheme. For example, if three engineers remove their interest in a document, other similar engineers should not see this document highly ranked, while sales employees may still give this document a high ranking.

Expert-Guided, Personalized Search Across Applications

Consider the invention in the context of the entire enterprise. Although user actions are done through business application interfaces on their PCs, a behavioral journal called "my library" is stored and maintained in the system server. Neither the PC nor the application involved needs to be concerned about the journal.

My Library/Behavioral Journal

This is a per user object. It is generally invisible to the users unless power users or applications want to use them directly. The data in the library can be mined or learned before the system goes live. It continues to improve itself, adjust, and adapt to the real business usage of the content and their queries. The library stores user profiles and attributes, all queries, relevant content URIs, one or more indexes for all relevant content and data, query caching, content and data caching, access time, personalized ranking formula, proximity hashing, and a loading ratio control for the privacy policy considered.

A desktop version of My Library can be added to provide content caching, content push/update/alert, and disconnected content access.

Domain Expertise Networks

One aspect of the invention concerns examining multiple personal libraries or behavioral journals. When enterprises start to analyze many people's journals from peer and expert dimensions, great insights on information consumption and employee productivity emerge.

Peers are defined herein as a group of users with common interests, such as products, topic sets, events, job roles, locations etc.

Experts are defined herein as a group of visitors with a different knowledge and skill sets than the person querying or browsing, but the person querying and browsing depends on the experts to do his job effectively.

For example, an engineer has a peer group of other engineers, and also has an expert group made up of product managers, sales people, some customers, HR staff, and office assistants. Peers and Experts can change when context is changed. An engineer, John, may play roles beyond the organization he is in. He could be a cross-functional committee member, and physically work in London office. So John has three contexts that he is part of. This context is referred to herein as a Domain Expertise Network or DEN. An employee may belong to several DENs. Various types of DENs are discussed in greater detail below.

Architecture

Expertise Index System also referred to as an Expertise and Behavioral Repository: This element is key to the invention. It is a server based system with a service-oriented architecture (SOA) using Web services, XML, J2EE, and other foundational technologies.

The following components are key parts of the invention:

Behavioral Instrumentation: Also referred to as a Work Monitor, this element is responsible for implanting and recording user behavior on various business applications. The application search form is one of many observation posts that the invention implements. Browser and application navigation, file upload, Web plug-in, page-tags, email server and client integration, content management, document management, records management, and collaboration systems are all common places for instrumentation. The invention also goes back in time, and parses common log files, such as Web server logs, query logs, directory files, e.g. LDAP, to build and extract historical or base level expertise.

Real-time Behavioral Journals: This element is a per user object described above.

Domain Expertise Networks: This element is the work relationship object, described above, that connects personal, peer, and expert associations, and that records repeated role-based enterprise work patterns.

Non-Uniformed Network Index (NUNI): This element provides the most relevant, timely and authoritative search results. This is discussed in detail below.

Contextual Mapping and Dynamic Navigation: With the help of personal, peer, and expert journals, the NUNI index can not only produce good search results, but also provide additional contextual information that the users are not directly asking via their search queries or keywords. The contextual results can be presented back to the users in a search result sidebar, or as part of personalized, dynamic navigation. Dynamic navigation is discussed in greater detail below.

Productivity Reports and Solutions: This element generates various reports based on the behavioral journals and NUNI index.

In summary, the Expertise Index System focuses on enterprise Subject Authorities, Work Patterns, Content Freshness, and Group Know-how to deliver expert-guided, personalized information.

Technical Overview

Figure 3:
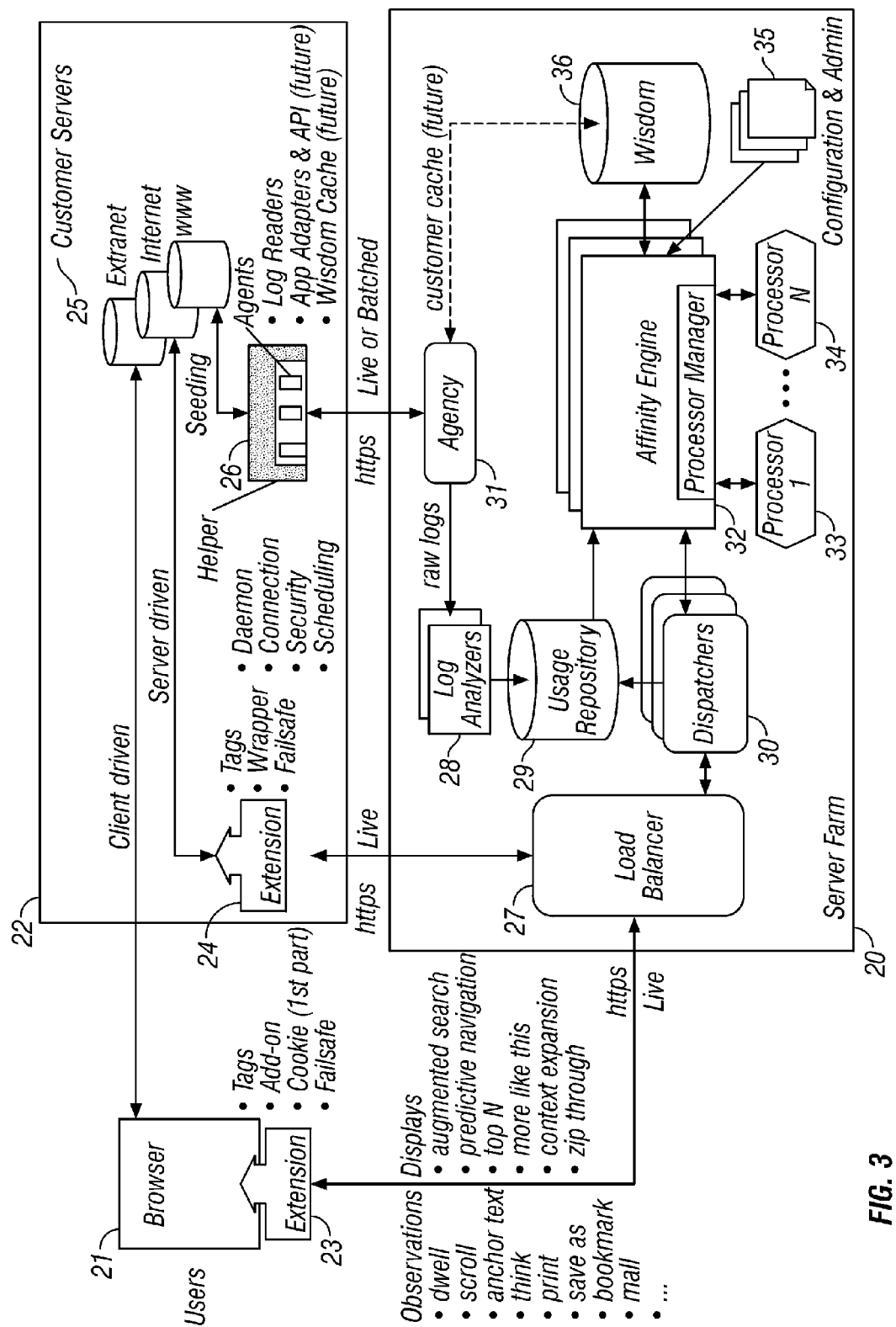
FIG. 3 is a block schematic diagram showing system architecture according to the invention.

FIG. 3 is a block schematic diagram showing the system architecture of a preferred embodiment of the invention. A more detailed discussion of various aspects of the architecture is provided below. The architecture consists of a server farm 20, a customer enterprise 22, and a user browser 21. The user browser is instrumented with an extension 23 and accesses both customer servers 25 at the customer enterprise 22 and the server farm 20 via a load balancer 27. Communication with the server farm is currently effected using the HTTPS protocol. User access to the customer server is in accordance with the enterprise protocols. The browser extension 23 is discussed in greater detail below.

Of note in connection with the invention is the provision of a failsafe. The extension 23, as well as the enterprise extension 24, are constructed such that, if the server farm 20 does not respond in a successful fashion, the extension is shut down and the enterprise and browser interact in a normal manner. The features of the invention are only provided in the event that the server is active and performing its operations correctly. Therefore, failure of the server does not in any way impair operation of the enterprise for users of the enterprise.

As discussed above, an extension 24 is also provided for the enterprise which communicates with the load balancer 27 at the server farm 20 via the HTTPS protocol.

The enterprise also includes a helper 26 which communicates with the server farm via an agency 31 using the HTTPS protocol. The agency retrieves log information from the enterprise and provides it to log analyzers 28, which produce a result that is presented to the usage repository 29. Information is exchanged between the affinity engine 32 and the browser and enterprise via various dispatchers 30. The browser itself provides observations to the server and receives displays in response to search queries therefrom. These observation and displays are discussed in greater detail below.

A key feature of the invention is the affinity engine 32 which comprises a plurality of processors 33/34 and a configuration administration facility 35. During operation of the invention, a form of information, also referred to as wisdom, is collected in a wisdom database 36. The operation of the affinity engine is discussed in greater detail below.

The inventive system is typically installed as an enhancement to an existing search system based on conventional engines provided by vendors, such as Verity, Autonomy, Google, etc. This content and data search system based on conventional technology is referred to as the existing search mechanism.

The inventive system is implemented as a wrapper for an existing search mechanism. When a user issues a search query, the query is handled initially by the system. The system, in turn, typically forwards the query to the existing search mechanism. It may also perform one or more searches or related operations against its own internal indexes and databases. Once the results from the various searches have been obtained, they are merged together into a single set of results. The actual presentation of these results is at the discretion of the customer, who may either take the raw results data from the system and present them using a JSP, CGI, or similar mechanism, or else use the default search results page provided with the system, possibly customized using cascading style sheets or other similar techniques.

Each document in the results is generally presented along with a variety of possible actions for the user to take on the document. The available actions are site-configurable, and can include, for example, "think", "view," "download," "email," or "print." The system is informed when a user selects one of these actions for a particular document. That data are then used to infer the relevance of a particular document with respect to the query that yielded it. Thus, if a user selects the "view" action for a document, the system might infer that the document has certain actual value to the user for that query, while if the user selects a more permanent action such as "print" or "download," the system might infer that the document is highly relevant to the user. The system can detect virtual print or download to give an accurate approximation as if a physical print, download, or bookmark has happened. The techniques rely on detecting activities of users on the browser for a certain amount of time, e.g. over one minutes, where documents remain open for a long time, i.e. long dwell. On the other hand, if a user does not perform any action at all against the results from a query, the system might infer that the results were irrelevant to the user. This data are retained and used to influence the results of future queries by the user and to generate quality metrics.

Libraries

The system maintains a library of content reference and/or use for each user. The library is also called the behavioral journal. This library is similar in some sense to bookmarks in a Web browser, though it is not necessarily visible to the user. Indeed, the user may not even be aware of its presence. Depending on how the system has been configured, a document name and its location may be added to a user's library automatically when certain actions for a document are selected from the search results. A document could also be added to a user's library explicitly with an optional "add to library" action from the search results. The presence of a document reference in a user's library generally indicates that the document is of particular interest to the user. Thus, if the results of a query produce a document that also appears in the user's library, its ranking is typically improved.

In some configurations, it is possible to add a document to a user's library directly, without first encountering it in search results. Such a document need not be indexed by, or even accessible to, the existing search mechanism. However, because it is present in the user's library, it can still be merged into the final search results if it matches a query, and it is therefore available in the results produced by the system. Content discovered in this manner is typically quite valuable and so is usually given particular preference in the result rankings.

Relations

People in businesses relate to each other in a number of different ways. For example, there are relationships between peers in a group, between superiors and subordinates, or between subject matter experts and seekers. When these different kinds of relationships are modeled and observed, they reveal insights that can be used to influence and refine search results. For example, if several members of a group of peers all find a particular document to be helpful, then there is good chance that other members of that same group would find the document helpful as well because members of a peer group typically have similar interests. Similarly, if someone is seeking information about a particular subject, then documents that a known expert in that subject found useful would probably be valuable to the seeker as well.

The system maintains one or more named relations for each user to represent these kinds of relationships between one user (the subject) and other users (the related users) in the system. A relation is formally the set of users that have a particular relationship with the subject. A relationship can be two-way or one-way. A two-way relationship applies equally in both directions between the subject and the related user. Thus, if user A has a two-way relationship with user B, then user B has the same kind of relationship with user A. An example of this might be a peer relationship, which could describe two users who are in the same organizational department or who have similar job descriptions: if user A is a peer of user B, then it is also the case that user B is a peer of user A. On the other hand, a one-way relationship is directed: if user A has a one-way relationship with user B, it is not necessarily true that user B has that same kind of relationship with user A. An example of this might be a superior-subordinate relationship: if user A is a subordinate of user B, then it is not the case that user B is a subordinate of user A.

Because related users are users of the system, they have libraries of their own. Depending on the configuration, the system can search the libraries of some or all related users as part of a query and merge any hits into the results. The degree to which results from a related user's library biases the baseline results can be configured both at the relationship level, e.g. experts have a larger bias than peers, and also at the user level, e.g. some peers may exert more influence than others.

In the default configuration, the system maintains two different relations for each user:

Peers: This is a two-way relationship intended to represent users with common interests, job roles, locations and other factors. People can belong to multiple peer groups based on different contexts. The system develops the peer groups through learning. Peer group change and adapt according to community and business changes.

Experts:, This relationship represents skill sets or knowledge a person possesses. The system detects experts by examining the community and individuals who have the ability to discover and collect the most and useful documents having the most impact. Experts are relative. An expert today may become less so if the person stops to be the connection to the most useful content.

Although this typical configuration only provides a single peers relation and a single experts relation for each user, an advanced configuration might supply two or more of each, with each peer and expert pair called a Domain Expertise Network (DEN). Multiple peers relations or DENs allow a user to identify several different peer groups that are each relevant at different times, e.g. a departmental group for day-to-day operations, a special interest group representing a committee membership, etc. Multiple experts groups allow a user to have several different sets of experts focused on different subject areas.

Monitoring User Activity

Figure 4:
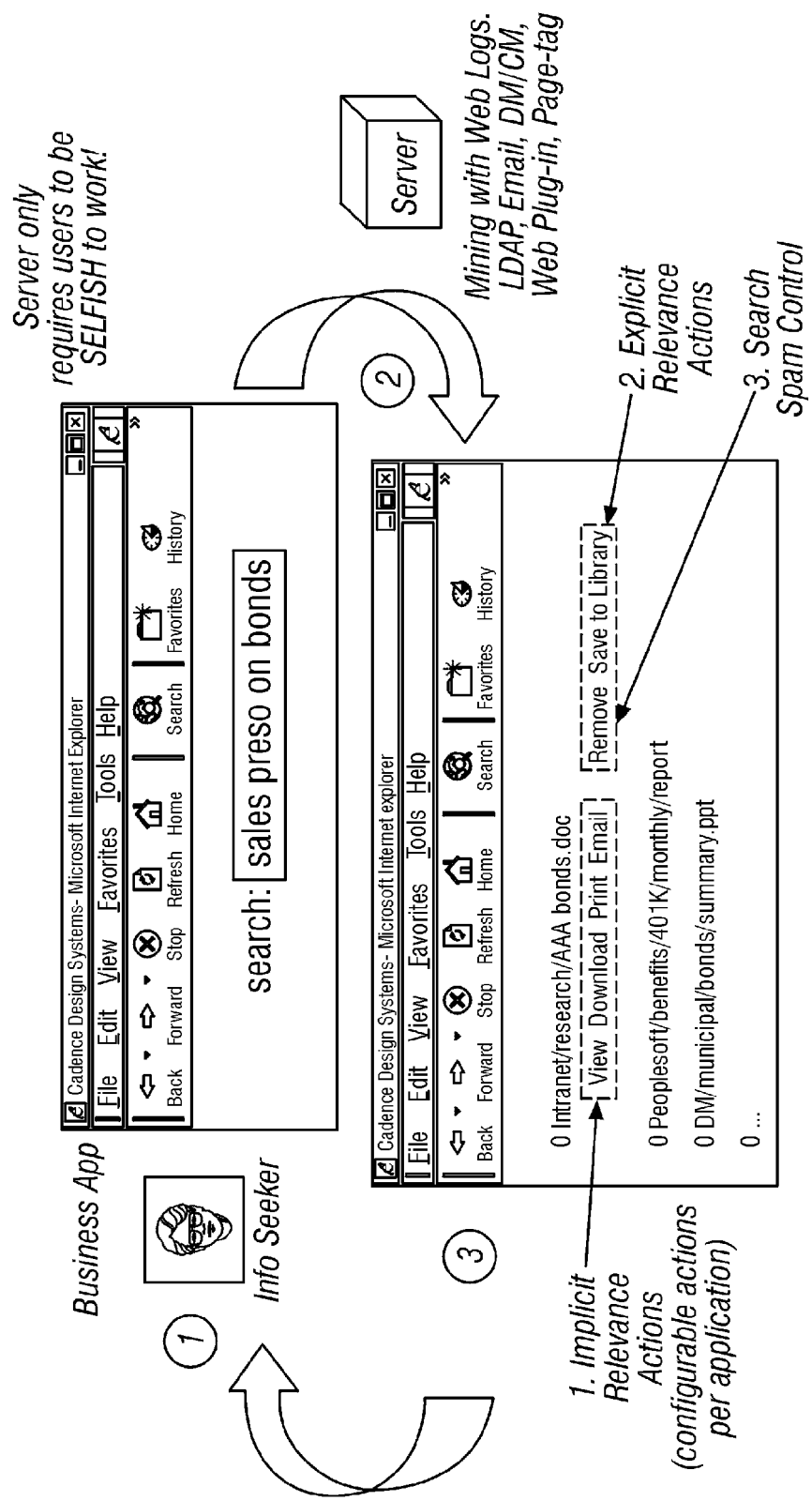
FIG. 4 is a flow diagram showing the capture of behavioral relevancy by an embedded application according to the invention.

FIG. 4 is a flow diagram showing the capture of behavioral relevancy by an embedded application. In FIG. 4, an information seeker is using a business application. In doing a search, such as "sales preso on bonds," the server performs various data mining activities and produces a result for the information seeker. In the process of doing so, the invention makes observations of implicit relevance actions, such as "view," "download," "print," and "e-mail." The server also makes observations with regard to explicit relevance actions, such as "save to library," and actions similar to spam control, such as "remove." These items are discussed in greater detail below. The observations made by the system are used to determine the value of a particular document to a searcher. The system accumulates information about the value of the document and then develops a usefulness measure for the document, as discussed in greater detail below.

Figure 5:
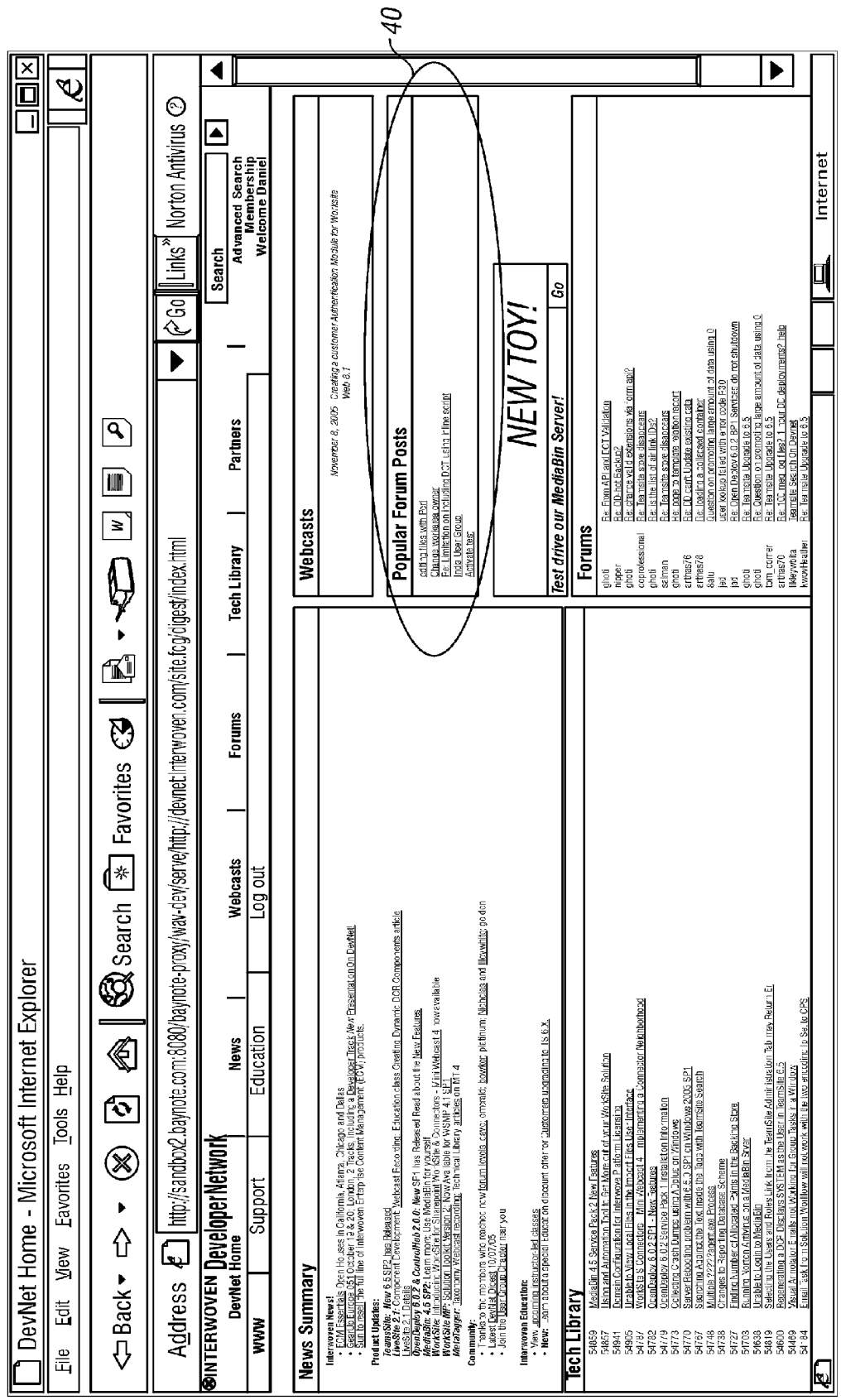
FIG. 5 is a screen shot showing an inline user interface according to the invention.

FIG. 5 is a screen shot showing an inline user interface according to the invention. Because the tags used in the system are configurable and customizable, the user interface can be made to blend into an existing Web site for a particular enterprise. The example given in FIG. 5 of a public Web site.

Figure 6:
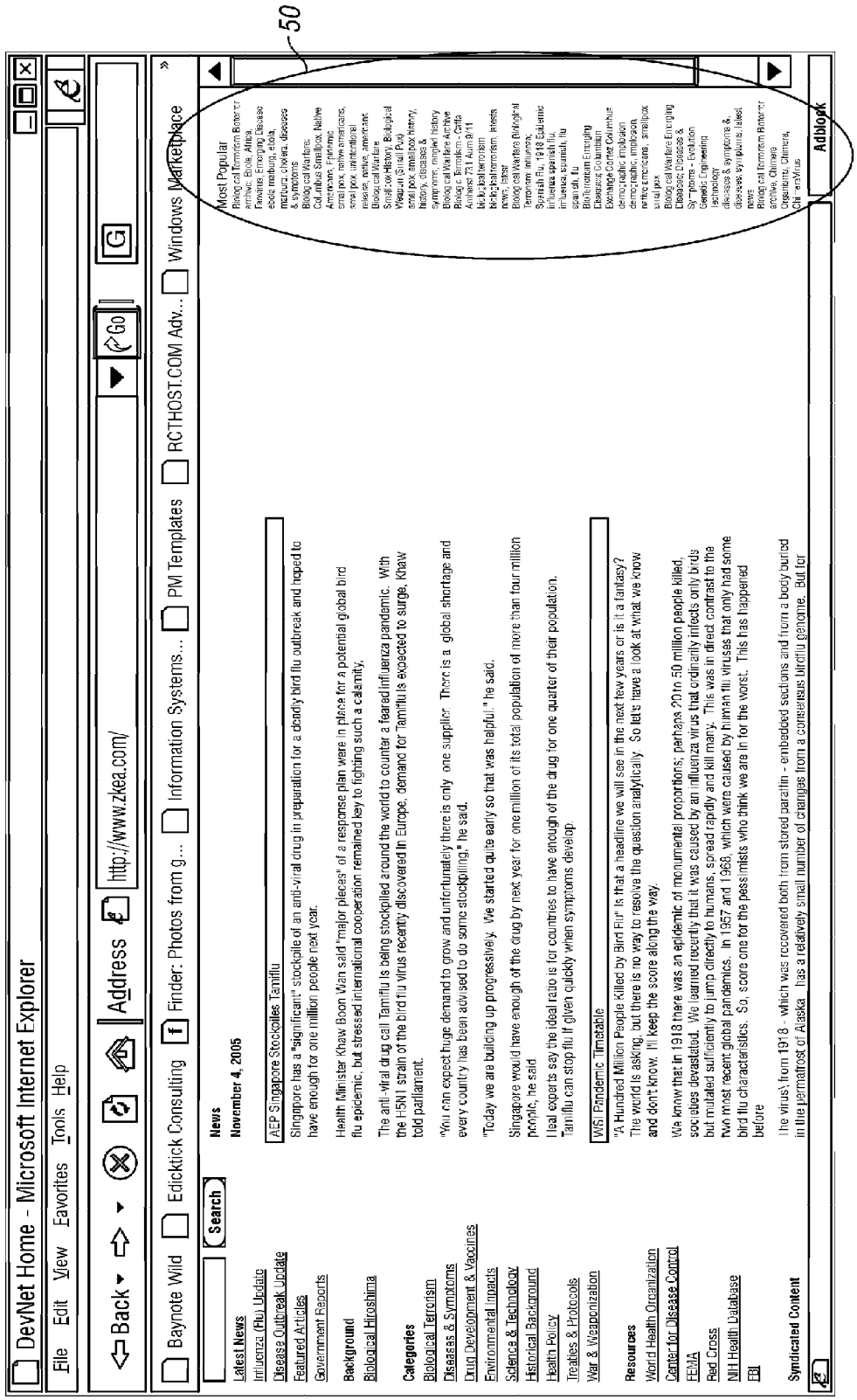
FIG. 6 is a screen shot showing an inline user interface rendered using Java Script tags according to the invention.

FIG. 6 is a screen shot showing an inline user interface (UI) rendered using JavaScript tags according to the invention. This particular example shows the "most popular" tag, which gives a list of the most popular documents to the end user. The UI is rendered using JavaScript tags. Other tags, such as "next step," "similar documents," and "preferred" are rendered in a similar fashion.

Figure 7:
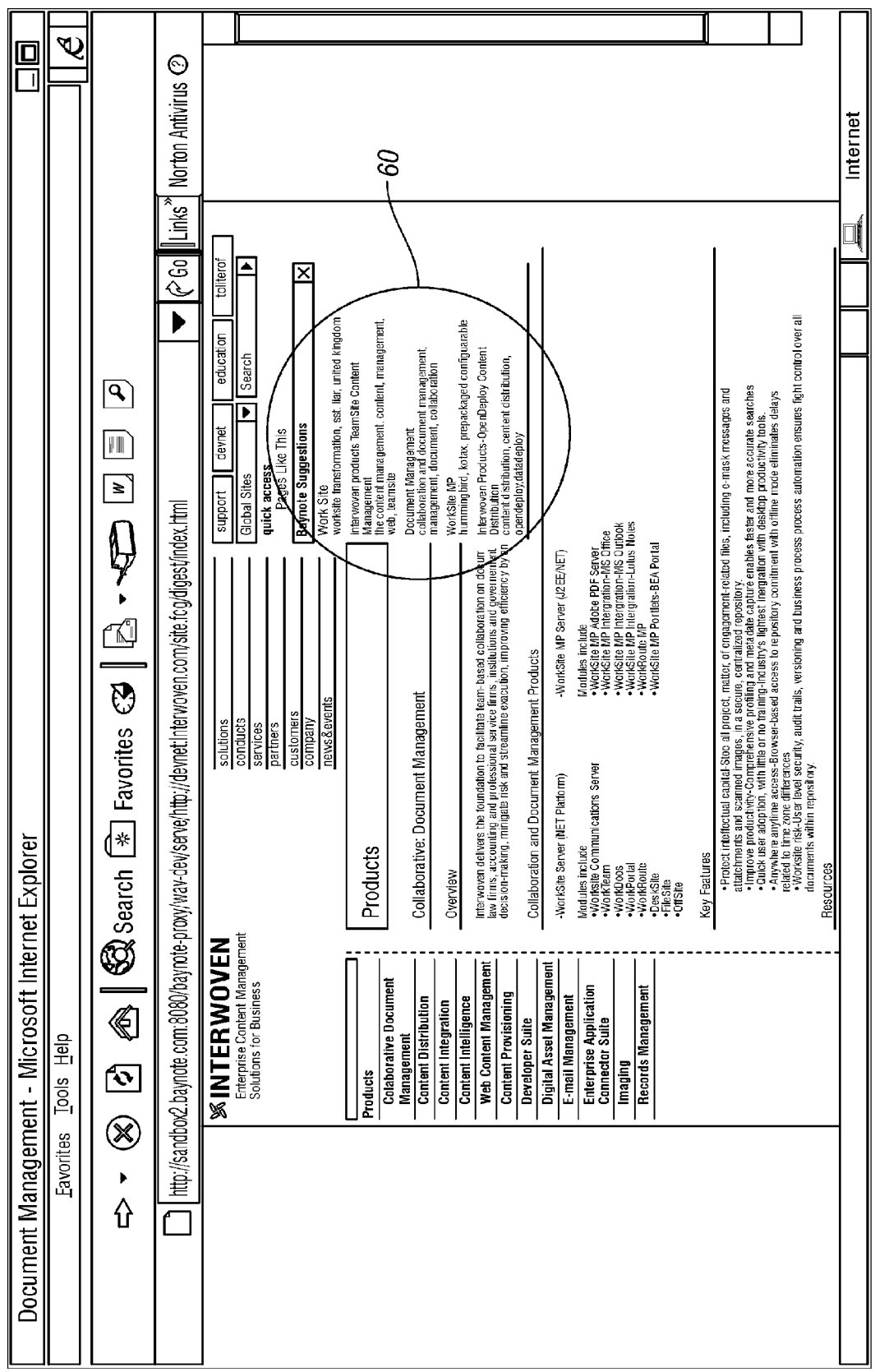
FIG. 7 is a screen shot showing a popup user interface according to the invention.

FIG. 7 is a screen shot showing a pop-up user interface according to the invention. As with the inline user interface, this interface is rendered using JavaScript tags. This particular example shows a "next step." This tag fades in and, when closed, out to enhance the user experience. As with the inline tags, the pop-up dialogue is also configurable to blend into any existing Web page's style.

Action Monitoring/Observations

The system has an active interest in knowing which documents users find helpful or relevant. However, users cannot generally be relied upon to indicate explicitly to the system when a particular document is considered helpful or relevant. Instead, the system has to infer this information from actions users would take anyway on a document, with or without the system.

One way to do this is to present to the user one or more convenient buttons or links for typical actions with each document in the search results. Because these actions are available with a single mouse click, as opposed to the multiple clicks that are typically required to perform most actions using normal browser controls, users tend to use them rather than the standard browser controls for performing these actions. Furthermore, because these buttons or links are under the control of the system, the system is able to take note of the actions a user takes with respect to a document. Thus, users are given a convenient mechanism for performing actions they would perform anyway on documents in a set of search results, and the system is able to monitor these actions.

In practical terms, intercepting these user actions is straightforward. As is normally the case with HTML, each button or link representing an action has a URL associated with it. Normally, such a URL would refer directly to the associated document. However, with the system these URLs instead refer to a CGI, servlet, or similar mechanism associated with the system. The URL contains information about the user, the document, and the action the user wants to perform. The system logs the action and related information, and then redirects the request to either the original document, in the case of simple "view" type actions, or some other kind of Web resource to complete the requested action.

Most content search systems make the title of a document an active link to the document when presenting search results. The system uses this standard convention as well, except that the active link is treated as a "view" action and monitored in the same manner as the other actions described above.

An optional "add to library" action is available for documents as well. As the name implies, this action adds the document to the user's library. This is a way for users to inform the system explicitly that a document is particularly useful. A user's primary motivation for using this action is to ensure that the document is considered favorably in future queries because documents in a user's library are generally given improved rankings.

When a user elects to take responsibility for presenting search results manually, URLs for the configured actions are provided along with the other usual data for each document in the results. It is the customer's responsibility to ensure that these URLs are used for the various actions users might take on the result documents, or else the value of the system is diminished.

General Implicit Observations of Search and Navigation

The system uses more generic facility to observe user behaviors against all content during search and navigation. The observations are made implicitly without user participation other than their doing their normal browsing and searching. Observations are consolidated from either search and navigation and then used to improve future search and navigation.

Query Monitoring

The system also benefits from knowing the original query that yielded a document on which a user takes an action. For example, if the system notices that a user issues the same query later, or if it notices several different users making the same or similar queries, it can increase the ranking of documents in the new query that were found interesting in the original query. However, because query strings can be rather cumbersome, it is not always practical to include them in the action URLs. Instead, the system maintains a database of query strings and issues a unique ID for each. This unique ID can then be included with the action URLs presented in the search results. When a user takes an action on a particular result document, the system can determine the query that produced that particular document by looking up the query ID.

Blended Search

The system uses blended search to enhance search results. In a blended search, a single query is passed to two or more separate search processors, each of which produces a set of zero or more documents, referred to as the result set, that match that query in some fashion. Depending on the configuration and circumstances, the same document may show up in one or more of the result sets from these various searches. Once all of the search processors have completed the requested query, their result sets are merged together into a single result set. Rankings are assigned to individual documents in the merged result set using a configurable formula that takes into account such factors as the number and/or type of search processors that produced the document and the document's ranking within each of those individual result sets.

The two distinct search processors need not be distinct software entities. For example, the same search engine running against two different indexes and/or with different configuration parameters could constitute two distinct search processors. More important is that two distinct search processors should typically yield different results for the same query. One might consider that each search processor offers a different point of view for a query.

Each search processor can be assigned a weight that determines the degree to which it influences the rankings in the merged search results. This weight can be either a static constant, or a dynamically computed value that varies according to the query, results, or other circumstances.

Search processors can, but do not necessarily, run independently of each other. Some search processors can be configured to take the result set of a different search processor as input and manipulate it in some way to produce its own result set. This kind of search processor is referred to as a filter. Filters are useful for such tasks as narrowing the results from a different search processor, e.g. removing documents that are too large, too old, etc., or modifying them in some way, e.g. computing summaries or titles from document contents, adding annotations from revision logs, manipulating the ranking score, etc. A search processor that does not filter the output of another search processor is referred to as an independent search processor. An ordered sequence of search processors in which the first is an independent search processor and the second and subsequent search processors acts as filters for the search processors preceding them is referred to as a pipeline. The individual search processors that make up a pipeline are also referred to as stages.

The result set of a blended search is formed by merging the output result sets of one or more pipelines. As a rule, each pipeline produces a score for each document in its result set that is used for ranking the document's relevance. When the results of two or more independent search processors are blended, these scores are normalized to the same range, then multiplied by a scaling factor. If the same document appears in more than one pipeline's result set, the scores from each result set are added together to form a single score in the blended result. These accumulated scores determine the final rankings of the documents in the blended results, with the highest scores being given the best rankings.

As a practical matter, separate pipelines can be run in parallel for efficiency. On a conceptual level, the various stages of a single pipeline are run serially, though in actual practice some parallelism can still be achieved when stages are able to produce portions of their result sets incrementally. The composition of the pipelines that are used in a blended search and the manner in which they are run, e.g. serial vs. parallel, is configured by the administrator and/or manipulated dynamically by the end user.

In a typical configuration, the existing search mechanism that is being wrapped by the system is referred to as the baseline processor. Any other search processors are referred to as ancillary processors. A baseline processor is normally built on top of conventional search technologies and is therefore capable of standing alone as an adequate, though suboptimal, document search mechanism. Amongst other things, this implies it should have access to the majority of public documents in an enterprise, have a query processor capable of handling typical requests from most business users, and that it not act as a filter stage in a pipeline. Ancillary processors, on the other hand, have fewer such requirements: they may have access to only a handful of documents, they may or may not use a conventional search engine to accomplish their goals, and they may in fact participate as a filter stage in a pipeline.

Note that the system can in fact be configured with two or more baseline search processors. This is sometimes referred to as federated search, in which the results of otherwise independent search engines are merged. Though this is not necessarily a goal of the system, it is a beneficial special case of its blended search technology.

Figure 8:
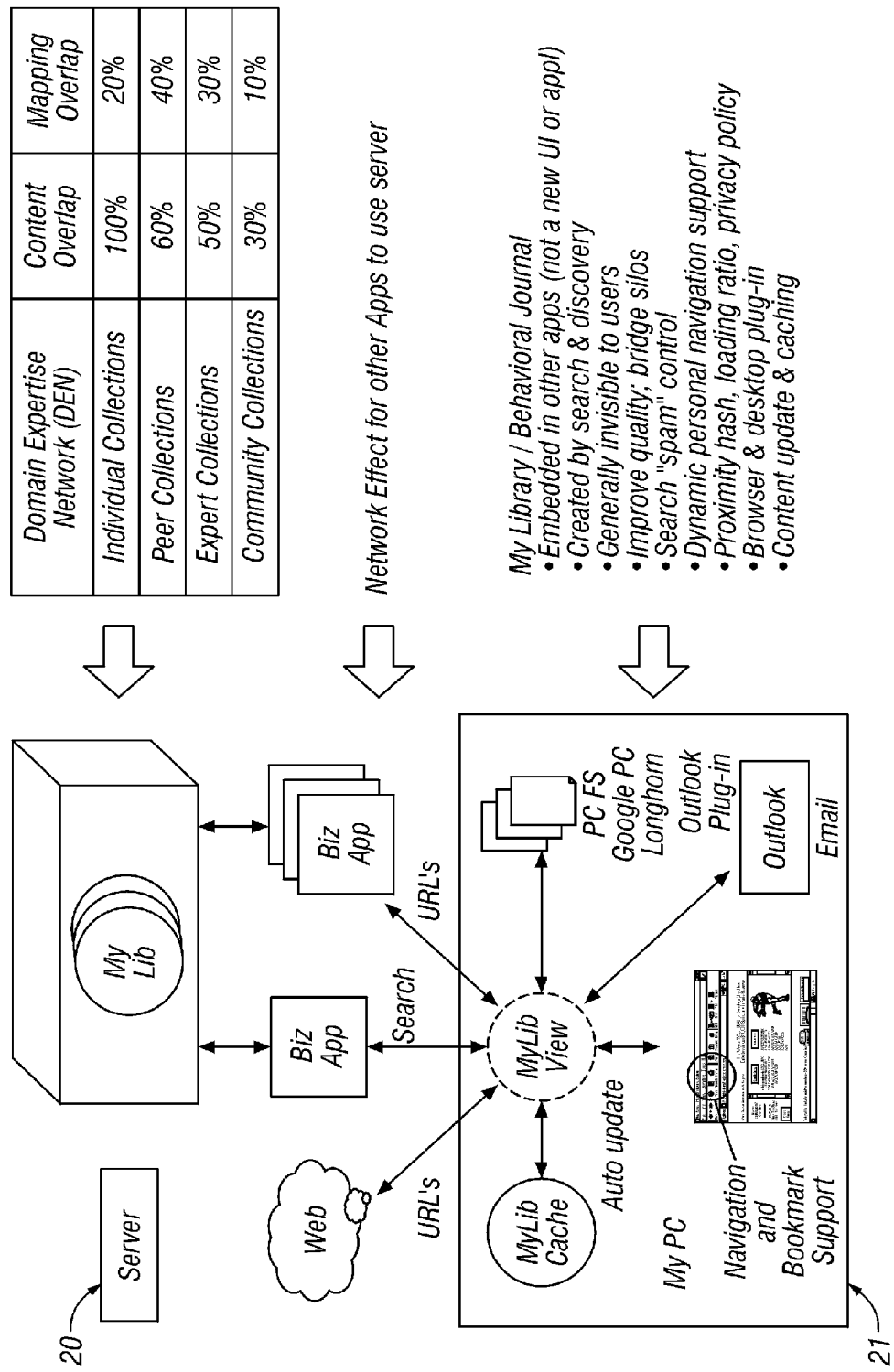
FIG. 8 is a block schematic diagram showing expert-guided personalized search across applications according to the invention.

FIG. 8 is a block schematic diagram showing expert-guided personalized search across applications according to the invention. In FIG. 8, the server is shown including information about the user's library, "My Lib." The user's browser 21 is shown having a "My Lib" view. The source of this view includes searching of a business application, Web searches, and other business application information. This creates a network effect so that other applications can use the server as well. The user's library is a behavioral journal. It can be embedded in other applications and is, therefore, not just a new user interface or application. The contents are created by user search and discovery and are generally invisible to the user. The analytics of the system allow the improvement of quality and provides bridge silos. As discussed herein, there is a form of spam control implicit in operation of the invention. The system provides dynamic personal navigation support. A proximity hash, loading ratio, and privacy C policy are also implemented. The invention operates in the form of a browser and desktop plug-in and includes content update and caching. The information accessed in connection with the invention is pursuant to a domain expertise network, discussed in greater detail elsewhere herein, that consists of individual information, peer information, expert information, and community information.

FIG. 9 is a screen shot showing a user library according to the invention;

FIG. 10 is a second screen shot showing a user library according to the invention; and FIG. 11 is a third screen shot showing a user library according to the invention.

Sample Search Processors

The system can be realized with different search processors provided in connection with the affinity engine (FIG. 3), that can be combined in different ways to accomplish different goals. The following discussion describes several of the more common search processors that are available.

Lucene Baseline Search

This search processor is an independent baseline processor that generates its results by issuing a query to an existing Lucene index (see http://Lucene.Apache.org). The result set that it produces includes a content locator and a relevance score that is a floating-point number in the range of 0.0 to 1.0.

Library Search

This search processor is an independent ancillary processor that searches a particular user's library for documents that match a specified query. In a typical implementation, a Lucene index is maintained for each user's library, so this search processor is essentially a special case of the Lucene baseline search processor running with a different scaling factor against a different index.

My Library (My Lib)

This special case of the library search processor runs against the library of the user that has invoked the original query. It normally runs with a relatively large scaling factor. Thus, documents in which the user has previously shown interest and which match the current query tend to receive elevated rankings.

Relation Search

This search processor is an independent ancillary processor that searches the libraries of the related users in a given relation. It is conceptually similar to invoking the library search processor for each of the related users then merging the results. In practice, this can be optimized in a number of different ways, for example by performing each library search in parallel, or by maintaining a separate merged index for the entire relation.

My Peers

This search processor is a case of the relation search processor that has been specialized for one of a subject's peer relations. If the user has more than one such relation, the specific relation to be used for a given search can be determined in a number of different ways.

For Example:
It can be set by an explicit action on the part of the user, e.g. the user might indicate that work is currently being done in the context of a particular peer group;
It can be set implicitly by the current search context, e.g. the actual search form used to launch the query might select a specific peer group;
It can be computed, e.g. by analyzing the query itself.

The theory behind this search processor is that a user's peers tend to have similar interests to the user, so if a document was particularly interesting to a peer, i.e. the document is in the peer's library, then it probably is interesting to the user as well. This search processor generally runs with a relatively high scaling factor, thus elevating the rankings of documents that both match the query and reside in a peer's library.

Transitive Relation Search

Many, but not all, one-way relationships are transitive: if user A has a particular one-way relationship with user B, and user B has a similar one-way relationship with user C, then if the relationship is transitive it can be inferred that user A has this same one-way relationship with user C. If a given relation represents a transitive one-way relationship, then the transitive closure of that relation is the union of the members of the original relation with the members of the same relation for each of those related users. In a full closure, this process is continued recursively for each of the related users and each of their related users, etc. until the full tree of transitive relationships has been computed. In a partial closure, the recursion is limited to a particular depth.

The transitive relation search processor is an independent ancillary processor that searches the libraries of all users that belong to a full or partial closure of a specified one-way relation. A single recursion depth can be specified for the entire relation, or a separate recursion depth can be specified for each member of the starting relation. Once the closure itself has been computed, the transitive relation search processor is very similar to the normal relation search processor, conceptually performing a library search on each user in the closure and merging the results. For this reason it can be optimized in the same manner as the regular relation search.

My Experts

This search processor is a special case of the transitive relation search processor that has been specialized for one of a subject's expert relations. If the user has more than one such relation, the specific relation to be used for a given search can be determined in a number of different ways, as outlined for the My Peers search processor.

The theory behind this search processor is that if a user can identify experts in a particular subject, then documents that those experts find interesting, i.e. that appear in the experts' libraries, are presumably of interest to the user as well when conducting a search in that subject. Furthermore, it is assumed that expert relationships are transitive. Thus, if user A considers user B to be an expert on some topic, and user B considers user C to be an expert on the same topic, then user A would consider user C to be an expert on that topic as well, even though user A does not necessarily know user C.

As with the My Peers processor, this search processor runs with a high scaling factor thus causing content selected by experts to be given elevated rankings.

Freshness

One important contrast between content searches in an enterprise compared to more general Web search is the importance of freshness or recency in the results. On the Web, somewhat older data are generally considered more valuable because they have had a chance to be evaluated and vetted by users around the world. In an enterprise, however, the opposite is true: most users have already seen the older data, so when a search is performed newer data are usually more useful.

The freshness search processor is a simple ancillary filter processor that captures this difference by increasing the scores of more recent documents and decreasing the scores of older documents. The degree to which a document's score is changed varies according to its age. Thus very recent documents might have their scores increased more than less recent documents, and very old documents might have their scores decreased more than middle-aged documents. The thresholds and ranges for the various types of scaling are all configurable, making it possible, for example, to set up a filter that only penalizes old documents without enhancing new documents, or contrarily, to penalize new documents and enhance old ones.

Explicit Bias

Some documents are the canonical correct answer to certain queries. For example, in organizations that must pay special attention to regulatory matters, e.g. HIPPA, SOX, etc., a query related to a particular procedure is ideally answered with the most current, official description of that procedure, possibly to the exclusion of all other documents.

The explicit bias search processor is an ancillary processor that recognizes certain queries or query keywords and injects a fixed set of documents in the results for those queries, each with a fixed score, usually a very high one. This is generally done without a formal search index. Typically, it is configured with a simple table that maps keywords to documents. It can be configured as either an independent processor or a filter. When it is configured as a filter, it can further be configured to either replace or supplant the input results. When the explicit bias search filter does not find a matching keyword, it leaves the input results unmodified.

Popularity

Some search topics tend to recur regularly in any given enterprise, typically with a small number of documents in the results towards which everyone gravitates. The system can detect these popular results by noticing when the same query is issued multiple times and then watching which documents are acted upon most frequently in response to these queries.

The popularity search processor is an ancillary filter processor that puts this knowledge to use. It detects popular queries and then increases the ranking of documents in the results that have historically been selected by previous users making the same query. In practical terms, it is similar to the explicit bias processor, except that the table of keywords to documents is generated automatically by the system from data obtained by analyzing the query and action logs.

Quality Metrics

Because the system watches both queries and the actions taken on the results of queries, it can monitor the quality of its results dynamically. This is then used for such purposes as return-on-investment (ROI) reports or feedback on site design.

A simple form of feedback on search quality can be found be comparing the query logs to the action logs. If a user query produces no corresponding actions, or perhaps only yields actions on poorly ranked documents, then the system can infer that the query produced poor results. On the other hand, a query that yields several different actions, particularly to highly ranked documents, might be considered good.

Another dimension for quality feedback is to compare actions on documents that would have been found by the baseline search processor to those that would have been found only by the system, or perhaps to documents that were found more easily because of the system. The system can accomplish this by taking note of which search processors contributed significantly to a document's relevance score when an action is actually taken on that document. If the only significant contributor to a document's score was the baseline search processor, then the system can infer that it did not add any particular value to that result. On the other hand, if one or more of the search processors contributed significantly to the document's score, then the system can infer that it did add value to the result.

By combining these two metrics, the system can dynamically produce interesting and valuable ROI reports. For example, one report might be to compare the ratio of good-to-poor search results for queries that were enhanced by the system to the same ratio for queries that were not enhanced by the system. If a dollar cost is assigned to poor queries, then the difference in the cost of poor search results rendered by the original search system and those rendered by the system can be computed. Another report might concentrate on the amount of time the system saves its users. For example, a document that was found only by a search processor and not the baseline search processor might be assumed to save the user two hours of manual research, while a document that was pushed from a low rank to a high rank by search processors might be assumed to save the user 30 minutes of research. If a cost per hour is assigned to the user's time, then a cost savings for using the system can be computed.

Non-Core Technology

Because the system is designed to wrap an existing document search mechanism, it necessarily employs a number of technologies that are not intrinsically its own. The following discussion describes these types of non-core technology used by the system. Those skilled in the art will appreciate that the following is only an example of a presently preferred embodiment of the invention, and the other technologies may be chosen to implement the invention.

Language

The bulk of the system is implemented usingversion 1.5 of the Java language, and all classes are compiled using the Java compiler supplied by Sun Microsystems in 1.5.04 of their Java Software Development Kit. It is presumed to run correctly in any JVM supporting version 1.5 of the Java language. If customers do not provide a JVM of their own, version 1.5.04 of the Sun JVM are used by default.

Application Server

Much of the core functionality of the system is implemented using Java servlets and Java Server Pages (JSP). The current implementation is written to version 2.4 of the Java Servlet specification and version 2.0 of the JSP specification. It should, in principle, run in any application server supporting those specifications. If customers do not provide an application server of their own, version 5.0.28 of the Apache Tomcat application server is used by default.

Search Engine

The system uses version 1.4.1 of the Lucene search engine to manage user libraries. The current implementation includes support for Lucene version 1.4.1. If customers do not provide a baseline search engine of their own, a basic implementation using Lucene version 1.4.1 is provided.

Web Server

Any conventional Web server can be used with the system to serve regular content. The reference implementation of the system uses Apache 2.0.52.

Tool for Virtual Configuration of Web Applications

A tool that configures a target web application with new capabilities, such that the new capabilities can be demonstrated live within the Web application, though the Web application has not been modified in any way.

Method for Virtual Proof of Concept

An automated process is provided that enables the evaluation of a set of software capabilities within existing Web applications by guiding the evaluator through a series of steps and automatically provisioning the necessary infrastructure to support the evaluation. The process is virtual in that it requires no changes to the target Web application and no installation of software.

One aspect of the invention concerns a virtual Web sales tool. In this embodiment, the invention comprises a virtual environment that is implemented using proxy technology. The system is used by a prospective customer to access a system Web site. This allows the prospective customer to see the "before they know" and "after they know" impact of the system against the prospective customer's live application. A virtual environment is created that mimics the prospective customer's live application, without copying the live application's content. The system nonetheless performs interception and augmentation in this proxy environment without physically possessing any content or interfering with the structure of the live application. Thus, when a prospective customer comes into this virtual environment, they feel as though they are actually in their live application. One benefit of this embodiment is that the invention may be used to do instrumentation without having to go physically into a customer's application environment, get logging, or the customer's IT department involved. Thus, the customer does not really know there is a change, but can see the impact.

In this embodiment, it is possible to go through a process that requires no installation of software in the traditional sense and that allows a customer coming to the Website to have the same kind of experience that they would traditionally have with a traditional software provider, except the invention allows one to do it all online. This approach is virtual in the sense that there is nothing the has to do except interact with a Web browser to take advantage of the service. This embodiment provides a virtual proof of concept (POC) that automates the sales process for the system. The intent is to capture interest through the Website where a visitor comes in interested in a product. The user accesses the system with a click-through to the POC. Then, the system automates the process of going through the POC. Once they have conducted the POC, the service is turned on, and they are now a paying customer.

To capture the user's interest, through the Website, the users are allowed to "try it," for example. They enter their email address. The system validates the email address with a first-level screening. Then, the system sends an email after they try it, and maybe a link to where they can see screens about how the system works.

In phase two, the system generates a demonstration room for them. This is based on some of the information they gave the system in the first step, and in addition, the system now requires them to upload some information, a log file, for example, to provided the system with some historical information about how their Website has been used. The system then takes the log file, automatically generate a set of reports that explain to them what the expected increase in value the system can provide. The system then goes through an automated process and creates a "before and after" picture of what their site looks like before the system and then after the system.

There is a certain amount of backend provisioning to do to make that work. Once they actually commit, in phase two, the system explains to them that they need to upload their log files. The system can then provide them with a report that they can print out and use that to build internal momentum around the system. The system then allows them to use the system in a POC fashion for some period of time, and then converts them to a real customer. The period of time could be 30 days, it could be 90 days, for example. Thus, this aspect of the invention takes a prospect through a methodical process online that requires very little human intervention to allow them to experience the value of the system, without having to interact directly with a salesperson to feel any pressure, and without having to send a salesperson to their site.

Method of Algorithm of Usefulness

This aspect of the invention concerns method that derives a score which describes the usefulness of an electronic asset. In contrast to well-known relevancy algorithms, which help to find documents relevant to a query context, the computation of usefulness measures the actual usefulness of any electronic asset based on user behaviors with respect to the assets. Given a topic, there might be hundreds or thousands of relevant documents but only a few that are useful. Usefulness measures how useful a document is for a given user, while relevancy measures keywords that match with the content. Usefulness scores are computed for any electronic asset and for arbitrary user population sizes, ranging from millions to a single user.

Thus in contrast to traditional search technology, which is focused on relevancy detection, the invention detects usefulness. With regard to relevancy, for example, if one is learning Java programming, there are hundreds of relevant Java books that can be used to learn Java. Are they all useful? No. If one wants to really learn Java, one should ask a Java guru what books to read, and they probably will recommend two or three books, instead of hundreds of Java books. Thus, relevant books comprise all these hundreds of books, while useful books are the two or three very useful ones. This usefulness is based on the knowledge of experts, community, and peers.

Expert, peer, and community knowledge is automatically extracted and assembled by the present invention based on observed behaviors of the user population. As user behaviors change over time, the system adapts its representation of expert, community, and peer knowledge. User behaviors can be recorded in real time (through various means of observation described elsewhere in this application) or extracted from existing log files of user behavior. On an ongoing basis, the system can continue to improve performance, based on ongoing real-time observations and getting continuing updates of the log files. The updates amount to the differences in the log file, for example on a month-by-month basis. That is in addition to the information the system captures based on observations. There are certain things that are in the Web logs that the observations do not track and there are certain things that can be observed in real time that existing web logs do not track. There is more activity than is needed in runtime or user time, but it is interesting to look at these after the fact and draw generalizations from the broad sets of data that are captured in these log files.

Method for the Self-learning and Adapting of Systems

This aspect of the invention concerns a method that enables the system to identify changes in the behavior of its user population, with respect to both electronic assets and members of the user population themselves, and automatically adapts its operation to self-correct for changes. Self-correction enables systems to identify and adapt to changes proactively before they are obvious, while minimizing the need for administrative intervention to keep systems maintained.

Thus, this aspect of the invention concerns an attribute of the system, i.e. inherited nature of system, because it observes peoples' behavior. As peoples' behaviors change, their preferences change, and their useful content changes. The system automatically adapts to that change. Thus, the system is, by default, a self-learning system that can correct itself because, when people start to correct themselves, the system follows them.

The Inventive Technology is Content Type Independent or Content Agnostic

The system works against any content/information types, such as audio/video files, data types, such as RDBMS data, and application nodes, such as a "buy" button. Thus, the preferred embodiment of the invention comprises an independent and content agnostic system because the system does not look at the content itself. This is unlike traditional search technology, which parses content, picks up key words in the content, and uses those key words to select results. The invention, in contrast, is not concerned with what is in the content, but about the location of an asset and how people interact with that asset. The invention does not care what that piece of content is. It could be a text file in a simple case, but it can also be a video file, which has no text to parse and no index to be built in the sense of traditional technology.

The Inventive Technology Seeds the System from Web Server Logs, search Engine Logs, Web Analytics Server Logs, and other Log Files so that it can Generate Value from day one of the Operation Supervised guidance can be accomplished through administrators by assigning experts and peers based on their roles, reputations, and expertise etc., although it is not a necessary step Such information can also be inferred and extracted from historical log files. Because the system is a learning system, it can derive more value over time as people use the system. This aspect of the invention concerns seeding technology that makes the system useful from day one. It may not be 100% useful, as it would be down the road, but it would give at least 50% to 80% of the value. In this embodiment, the Web server log, which is actually a recorded history of what has happened in an enterprise, is used. It does not have the fine-grained information that is ultimately needed, but it has coarse-grained information. The log file provides historical information. The preferred embodiment uses weeks to months worth of a log file depending on the site's traffic patterns. Thus, the invention provides a way to take something a user already has, i.e. the log file, and turn it into a resource that is used to seed the system. Then, over time, the system learns more because the invention is making observations by means of the extensions to the browser or the scripts that are running, as discussed herein. The system takes advantage of not only basic logs, but also the analysis that is generated from those logs by higher order analytics which are available commercially from various companies known to those skilled in the art.

The Invention Federates Across Multiple Applications, Websites, and Repositories without Crawling or Indexing the Applications The federation is accomplished through users' actual usage of those applications. Federation is an attribute and a natural fallout of the core technology herein. The traditional approach to searching is to have multiple indexes, each of which is linked to a different repository or different application. A search is performed against each repository with separate indexes for each repository that are not cross-searchable.

In the inventive system, a federated search is automatically provided because when people use an asset in a context of an application, they do not care where they use it. They can use one particular piece of content in one sort of a silo, and the next minute can move into a different silo, e.g. start with a CRM system and then move into an ERP system. In this way, the user created a trail, i.e. a virtual link of the various systems. When this query is searched again, the inventive system can recommend information from the multiple different data sources, such that that federation is automatic because the user is creating the federation. That is, the user's pattern of usage of information from and across various data sources creates the federation.

The invention herein does not require crawling of Web sites or applications, or indexing of the applications or the contents thereof. Further, the invention respects any security that is already in place. A significant challenge in building federated search systems is that federated search systems must understand and work with the underlying security of these applications. It is difficult to do this because each application generally has its own security model. Generally, security models are not shared across different applications. The federation of search while protecting security is a huge challenge. The invention is unique in the sense that it does this naturally, without any specific adapters, and it guarantees that it can preserve perfectly the underlying security mechanism for that application. This is done in a very unique way. The system goes through the browser instead of implementing proprietary modules to preserve security.

Traditionally, to solve the federation problem, there would be some sort of search application that ties into each of the applications, and that comprises a specialized security model, conceptually. The problem is the search engine is actually building up an index of all of the content. When a search is performed, one cannot simply bring back a list of search results and then prevent somebody else from clicking on the list if they do not have access to it. So, in effect, the search engine replicates multiple security models in one index. The inventors have recognized that there is no need to do this because the system has a browser where a user queries through the system. The system then accesses its database of content and, in return, provides a list of results. The system does not filter out all the content at this time but, instead, filters as the results are returned, The system provides technology inside the browser that checks each of these repositories in real time if this user in this session can access this content. If the answer is no, the user is prevented from reviewing the content. It is kept off the list. The user does not even know it came up. The primary driver for whether the browser has access is the person who is logged into the browser at the time, based on the person's privileges in the system, which determine whether the person can see the results. If the person can not see some of the results, the system does not show these results. Thus, the system is, in real time, asking the application if a particular user, e.g. the user currently logged in, can access the content right now. If this is true, let the user see the document. The system, in real time, every time, asks the application if the user has sufficient privileges. Further, it does not matter what mechanism is used because the person can have different access rights depending on whether they are group-based, identity-based, or profile-based.

Personalization, Driven Completely by Usages of Individuals, Peer Groups and Expert Groups at Non-predefined Levels Depending on Contexts Such as Query Terms, Navigation Patterns This aspect of the invention accomplishes personalized search by knowing who a user is thus, when the user exhibits certain behaviors when using the system, the user is self-identifying, e.g. through cookies, logins, etc. Even if the user is an anonymous user, the system places a cookie in the user's browser. Thus, when the user is using the system he leaves a personal trail, and the system then personalizes information based on who the user is. In the system, no one predefines relations based on personalization because the system is based on the user's behavior. The user's affinity with other people creates a space, referred to as a club. Thus, a user can form his own clubs implicitly by exhibiting interest in one area. No one actually is monitoring the user. The clubs are established all through the user's behavior.

Controlled Deployment of the Invention for Risk Management and Acceptance Tests. The system reduces the product deployment risk by controlling the number of people who can see the product features in the live running system. A special cookie is set and sent to a controlled testing population. With that cookie, the users of the site can see the invention's features while the general users have no visibility of these features. This is a desired way to deploy new technology in enterprises.

Augmented Search. This feature of the invention blends traditional full-text search with preference and activeness information from global, peer, and expert population to give users precise answers. This aspect of the invention states how the index is used. Using community insight, the invention can augment a search for a better result. In the augmented search, a search request is made to the customer's Web server and a result is obtained. Then, a request for search along with the Web server results, generating query, and user id is sent to search server. A response comes back. Then, the system sends augmented results back in search server format and the client renders the HTML.

Top N is a list of most useful information based on the context and driven by the usage of the community. The context may be set by a user query, explicit specification of topic, or presence on a particular web page or group of pages, for example. The invention also creates an insight called top ten, e.g. the top ten most important, related, useful pieces of information, given a topic or given a context. The user can see information based on context-driven usage of the information by the community. Top ten is a popularity result. Give the user the ten most popular links that have to do with a query term (context), or maybe no term. If there is no term, then the top ten most popular pages are returned. For all of these views, one can apply a filter, e.g. only look at the top ten that fall within the category of technology, or only look at the top ten PDF files.

More-Like-This expands the content in similarity based on content use and community profile. If the user likes a piece of content, the system observes that and there are other pieces of content that can be shown to the user based on the communities' interest. If the user likes a piece of content, the system observes that and there are other pieces of content that can be shown to the user based on the communities' interest.

More like this is a concept that applies when a user is reading this page now, but wants to find another page that is very similar. More like this is based on what the community says is more like this, meaning based on the usage pattern. Thus, the community sees that this page is similar to the page a user is reading Predictive Navigation Provides Short-cuts for Browsing Navigation Based on where Similar Users Start and End on an Application In this embodiment, if people with the user's profile come to a particular node in the application, then the user is highly likely to go to another, related place. This aspect of the invention predicts navigation and shortcuts traditional navigation based on previous navigation by peers and experts, including where they started and where they ended. Thus, the starting point and end point are critical to predict the user's navigation, to try to shortcut the middle part of a series of navigational steps, and send the user straight to the destination without wasting time in a lot of other places.

Predictive navigation is also referred to as "Next Step," and depends on which calculations or results one wants to display. Predictive navigation uses the navigation trail. There is a notion of a navigation trail; the system tracks the last N pages a user has been to. The system keeps a history of the query that was used to start this trail, if applicable. Thus, the user searches and a result comes up. The user may click on the result. The user may click on the result. The user may click again to go somewhere else. The user keeps clicking. The system accumulates this history of pages. It also notes that this entire history was due to a query. The system tries to, based on the user's history and other observations in the past, figure out where the user is going. The recommendations that come back are pages ahead of the user that other people have found useful, based on the history, i.e. the trail that the user has accumulated in this session. The system thus tries to match where the user has been and figure out where he is going.

This aspect of the invention states how the index is used. Using community insight, the invention can augment a search for a better result.

Zip through concerns the idea of having content preloaded on the system. As the user is going down the results, the system shows the user a preview of what that link is. Thus, instead of having to go to the page and changing the page that the user is viewing, the user just zips through. If he sees the content he wants that is the one he clicks into.

Dynamical and Adaptive Identification of Peers and Experts in the User Community The peers and experts are not hard drawn circles but a web with hub concentration and connections among various hubs. Information and knowledge is aggregated together and a fusion effect of wisdom is created naturally and automatically.

The invention essentially uses the same information to identify the user community. Who are the peers? Who are the experts? Not only does the invention identify what content are user would like to see, but also it can identify the actual people who are the user's peers. The grouping of peers is naturally formed. There are no hard boundaries on them. There are affinities in these people.

Implicit Voting that is Unbiased and Critical

This aspect of the invention provides far more accurate prediction of content usefulness than traditional content voting or survey. Document rating driven by usage reflects the real value of content. For a system such as the herein disclosed system to work reliably with high confidence, implicit observation is very important. If you ask people to vote on content, you tend to get biased results. You also get a sample that is highly skewed because most people do not have time to vote, to survey, to do anything that is explicit. People who do vote tend to have extreme opinions. They have a lot of time on their hands. They are outspoken and opinionated. Thus, they tend to misrepresent the entire population. The sample does not match the population. They also tend to vote negative more than positive. Thus, the invention preferably does not use explicit voting. It takes account of implicit actions. The user requesting a print is implicit because he's doing something else at the time he's making the request. The user is not giving feedback and not being asked for feedback. The invention exploits passive observation, not active feedback. Although, some embodiments could include active feedback, such as negative feedback.

Method for the Computation of Wisdom (Relative Value of Assets to a User Community Over Time)

This embodiment concerns method that observes information about electronic assets, the behavior of the user population with respect to electronic assets, and the changes in assets and behavior over time to discern the relative value of the assets to the user population over time. The method identifies a spectrum of values ranging from short-lived Information, to mid-range knowledge, to long-lived wisdom. Ultimately, the system provides an on-going, content agnostic, and adaptive institutional memory for the enterprises.

Computational wisdom means that the wisdom is a form of community behavior that, with regard to a set of assets, does not change over time. There are four items stated above in terms of how frequently people change opinions. Content, for example, is the least reliable thing to trust because content can change. Information is at a second level of trust. If information stays stable in view of people's opinions, that set of information becomes knowledge. If knowledge can go through time and continue to be used and supported, then that becomes wisdom. So, wisdom cannot change year to year. Knowledge may change from month to month, and information may change from day-to-day. Content by itself does not mean anything. Thus, if content does not become less useful over time, but it becomes constant as time goes by and usefulness remains constant, then it passes from content to the stage of information, then to the stage of knowledge. And over a certain period of time if the usefulness remains high or continues to increase, it becomes wisdom. Whereas, if there is fluctuation in the usefulness over time, then the change shows that maybe it is not really wisdom, but just current information that is interesting The Invention Provides Content Gap Analysis Through the Use of Content, Data and Application Instead of Relying on Content Owners' Speculation on What's Missing, Hot, Good, and Bad One does not know what content is missing, or what people are looking for. Also, it is not known what kind of content that can be produced comprises that which people need to consume. Because it is known from the system what the trends are, what people are asking for, the question of whether they are being satisfied with some content can be answered. That is, it is known where the gaps are. A lot of people are requesting this thing and are not finding anything useful. There is a gap.

The gap analysis report provides the ability to detect gaps in the content. The assumption is the content is there, they just can not find it. Frequently there are gaps. For such cases, the system ascertains what people are actually looking for and what is missing. Someone in a traditional search or navigation situation might search for something, and then either they fail, or if they do not resign to failure, they may search again, or they might potentially try to navigate. Through either of these mechanisms they might have success or failure. The system addresses this problem when someone starts to exhibit search or navigation behavior. It is known precisely what they are looking for, and the content that over time starts to get surfaced in search and navigation is the content that the community, itself, has deemed useful, without regard to a developer or merchandiser, or what merchandisers thought about the content. Thus, somebody is looking for something, they think it is going to be useful, but they are not finding it. This aspect of the invention allows one to quantify how dire the need is for this information.

Applying the Information Gaps at a Division, Company or Industry Level

The system provides the information flow over time, and helps company to manage information logistics. This aspect of the invention uses an applied information gap as a division flow over time to identify how information flows. The system allows one to understand what people are requesting and what content is available that can meet those needs. In time, it is possible to see the flow of information going in and out from division to division, from location to location. It is possible to see which location presents what information, or what group, or for what number of people.

The Ability to Identify Experts and Peers to Enable Companies to Locate Their Expertise at a Global Scale A dashboard for company or industry efficiency against information consumption can be measured, and white-collar workers productivity can be derived for the first time. This aspect of the invention is related to the ability to identify experts and peer-enabled companies with the expertise at a global scale, which allows the system to provide a dashboard for finding out who knows what and what can be done where.

Method for Building Automatic Marketing List Through Sponsored Advertising

This method identifies firms that are purchasing keywords and banner ad space on public websites for advertising purposes. The invention looks at both common and uncommon keywords, as well the context of given banner ads, and automatically generates a list of firms who are prospects for improved lead generation through their websites. The invention uses information found in the online ad itself and combines it with other public information sources to create a refined list of firms. The system then back-traces to the buyers of the ads, and automatically includes that information in the candidate prospects list.

Method for Improving Sponsored Advertising Conversion Rates

This aspect of the invention helps firms who wish to retain customers or increase lead generation. This is accomplished by increasing the conversion rate of sponsored ads e.g. Google and Yahoo ads.

Based on context and where a user came from, e.g. from Google with a given search term, the system can guide this user to the most useful information on the given website or collection of related websites. Without this capability, users who arrive at website no longer have the benefit of these public search engines directing them to the most relevant information.

The invention routes these users to the most useful information by observing where the community found the most useful information, given the initial query context from the public search engine. There are two steps in this process: 1) first, the system captures the collective wisdom on where useful information lies given the query context; 2) secondly, as users come in from Google or Yahoo, the system leverages this collective wisdom to guide people to exactly the right content.

Engineering Features

Usage-driven Link Analysis

If a link is clicked by a user in a particular site, the text within that link is then captured to augment future searches and navigation within that site. The text is noted only if the navigation trail leads to a successful document discovery, i.e. the user finds the document useful implicitly.

This aspect of the invention, usage-driven link analysis, concerns anchor text. This is very different than Google because when Google is page-ranking they parse every single page, and how many links, and other things. The invention parses links that are used by people. A link is a dead link unless it is used. So, if someone clicked on a link, then this link is useful by this person.

Furthermore, used links are cross-examined by many uses of peers and experts, in addition to that of the individual users. The peer and expert implicit validation and endorsement reduces noise from individual behaviors and strengthens the signal-noise-to-noise ratio.

The Successful Use of a Link is Determined by Capturing and Analyzing Individual User Behaviors, Peer Group Behaviors and Expert Group Behaviors, with Respect to that Link Usage of a link and the importance of the text is determined by a blended vector of user, peer, expert, query context, and time. This aspect of the invention, successful use of link, determines how an individual user behaves. In addition to looking at a link itself, where if a user clicks on it, it is useful, the system also does additional analysis on how many other peers similar to the user click on these links. For example how many other experts are different than the user, but the user depends on them to do his job, and who also clinked on the link. Thus, there is a two-level value: individual use of content, and that of the peer-group and expert group. These dimensions give the total value of the data.

Implicit Building of Context Terms

It has been historically challenging to create metadata for content. The inventive system deploys a unique way of letting the community implicitly create context terms that describe what the content is about. The context terms are learned through watching users conducting queries and finding useful results via the queries. It also includes navigation trails with the link text associated to the each use. The system builds its vocabulary by watching how visitors uses various terms to describe content and how a site uses links to describe content. Again, more used queries and links are more important and associated with content, while a link text that yields no use of a content in the downstream trails has no association to the content.

Capturing Such Information is Done Via One of Three Methods

JavaScript Tags. In this method, the page is instrumented with a piece of JavaScript. This JavaScript detects link usage and text and sends this information onward to a server.

Browser Add-on. In this method, the browser is instrumented with a piece of software. This software detects link usage and text and sends this information to a server.

Log Analyzer. In this method, the access logs for a web site are analyzed via a special program—the Log Analyzer—which detects usage of links and sends this information to a server.

All the information captured above is referred to as observations. The analysis of observations captured above takes place in the server.

Client

The system client comprises three general areas: the UI, the observer, and the proxy.

The client comprises a Web browser that entails the client UI (see FIGS. 5-7). The client includes a JavaScript observer to make observations on usage of the Web page at the client. One embodiment of the invention comprises a sidebar UI that shows the recommendations from the system engine. This aspect of the invention is embodied as JavaScript tags that generate the JavaScript necessary to display the UI. In this embodiment, enterprise Web content is displayed on the page and along the side there are system generated recommendations. A variant of the UI provides a popup, where the user clicks on something on a page, e.g. an icon, that calls into system code to display a popup in context.

The UI also comprises an API for fetching results from the system server. This is in lieu of gaining results directly from the enterprise installed search server. On the typical enterprise site the user types in the search term, clicks on search, and the search hits their Web servers. The Web servers then go back to their search server. The search server returns the result in some format, usually in XML, and then they have a presentation code on the front end to parse through the XML and present the search results. The invention operates in a similar fashion, except when their Web server goes back to the search server, instead of going back directly to the search server, it goes back to a server side extension. The extension then fetches the initial results from their search server, feeds that back to the system, and the system either reorders the results or, in any case, enhances the results, possibly adding more entries. This is provided back to the extension, and the extension reports back to their Web server. Their Web server continues on as it did before, parsing through the XML, reformatting, and sending it back to the client.

The JavaScript observer is a piece of JavaScript code packaged as a tag that is given to the user, and the user instruments their page using this tag. The JavaScript tag resides on the client page and makes observations. For example, a scroll or a dwell observation. If the end-user, for example, is reading a page, he would conform to what is defined as a "dwell." Once a dwell occurs, i.e. once the JavaScript observer has observed a dwell, it then sends back that information to the server. The server accumulates these observations.

Each of these observations correspond to a particular calculation on the back end, e.g. at the affinity engine. The augmented search concerns the notion of reusing the UI that the user has, instead of standing in between the presentation layer and the search server and augmenting the search from there. Predictive navigation, top ten, more like this, context expansion, and zip through are all types of tags that the user can put into a page, and they all use a different algorithm in creating suggestions.

The recommendations that come back are pages ahead of the user that other people have found useful, based on the history, i.e. the trail that the user has accumulated in this session. The system is thus trying to match up where the user has been and trying to figure out where he is going.

Observations

There are eight directional observations coming from the browser extension, which is a script that is watching the user's sessions and collecting information.

The proxy demonstrates the system UI on a user's pages where the system does not have access to the source code of those pages. These users are prospective customers who do not want to give out access to their pages. The system wants real-time pages, but with our tags injected into the page to show the user what the page would look like with the system enabled. To do this, the system uses a proxy that goes and fetches the page from the URL and then, based on a configuration of rules, alters the HTML of that page, and then sends that page back to the browser. The proxy sits between the browser and the target Web server, i.e. the potential customer's Web server. The proxy itself has its own URL, and it just passes in the target URL as part of that URL. A URL for purposes of this embodiment of the invention consists of two URLs. The URL used actually points to the proxy, but embedded in the URL itself is the target, i.e. the customer URL that you want the proxy to go to. The URL goes to the system first and reconstructs the URL, bringing you to the customer page. Then, the proxy makes an HTTP connection on your behalf to fetch the page for the customer site. It looks at the page and applies a set of rules to it, and then sends the page back to the user.

With regard to the client browser, the page is first instrumented with tags. The presently preferred format of the tag is in JavaScript (JS). The customer incorporates a JS file on their Web server. Then they refer to it in HTML with a script tag. Once the JS file is loaded, the file sets up an object at the system. Then, a place is set up in the page where the UI is displayed. On the system side, the system sends back HTML to the UI. The administrator on the customer side specifies a style sheet on the tag. Even though it is the same HTML, because the style sheet is different, the user gets a different color scheme and font, for example.

A plug-in may be provided that serves a similar purpose as the proxy, in that it also modifies the HTML and comes back with a search result. However, unlike with the proxy, the user configures the plug-in. When a search of the URL is performed on the user's internal site, the plug-in takes the search request, performs a search for the results, sends them back to the system, which then augments the results and sends them back to the plug-in. The plug-in does a swap of the HTML that is displayed. Thus, instead of displaying the HTML of that URL, the plug-in displays a modified page from the system. The plug-in also makes observations. Because it has more access to the browser functions than JavaScript does, it has a better ability to capture a wider range of observations.

The variant UIs work the same way. For example, Top Ten and predictive navigation work the same way as discussed above for the UI. The only difference is in the request. For example, when the user asks the system for augmentation, the system is asked for a specific calculation.

The JavaScript observer sits and waits and observes the user on the page. An observation is made of a user action and the observation is sent to the system, including all the information about the observation, e.g. what page it is, if there is user information.

Dwell is observed when the user has spent N number of seconds or minutes on a particular page.

Range can be selected as a matter of choice, but is typically around 30 seconds to five minutes, depending on the complexity of the document that being inspected. An excessive amount of time means the user walked away from the computer The system preferably does not capture an upper threshold because the user may be reading the document.

There is a virtual bookmark/virtual print feature where the user reads the document, and finds it useful, but can not remember everything the document has said, so he leaves the window up somewhere behind his other windows. The user then goes and does other tasks, and when he needs to refer to the document, he pops it back up; the user can tab document. Thus, even though the user did not bookmark the document, meaning that the information is probably useful for the next few hours or day or so, and the user does not need to bookmark it, it is useful for the user to keep the document up the window. In such case, the user has not explicitly bookmarked a document, but he has left it open for a reason. If one looks at a typical computer at any given time, the things that are open on the computer are not open because the user was done with them and just did not close them. They tend to be open because they are a virtual bookmark. Thus, things that are left open for a very long time, e.g. two minutes, five minutes, ten minutes, are considered to be virtual bookmarks.

A scroll concerns a scrolling of the screen.

The anchor text is the hyperlinked text that got the user to the present page. It could be as simple as the user clicking on a news items that then brings up some recent news about the subject.

Think is a usage pattern, i.e. a combination of a dwell and a scroll, or some action, mouse movements, etc., that indicates that the user is thinking about the page. Thus, think is a period of inactivity followed by some action.

Mail is when a user mails or forwards the content to another user, or virtually emails it in a similar fashion of virtual bookmark with the intent to mail.

Affinity Engine and Wisdom of the Community

Figure 12:
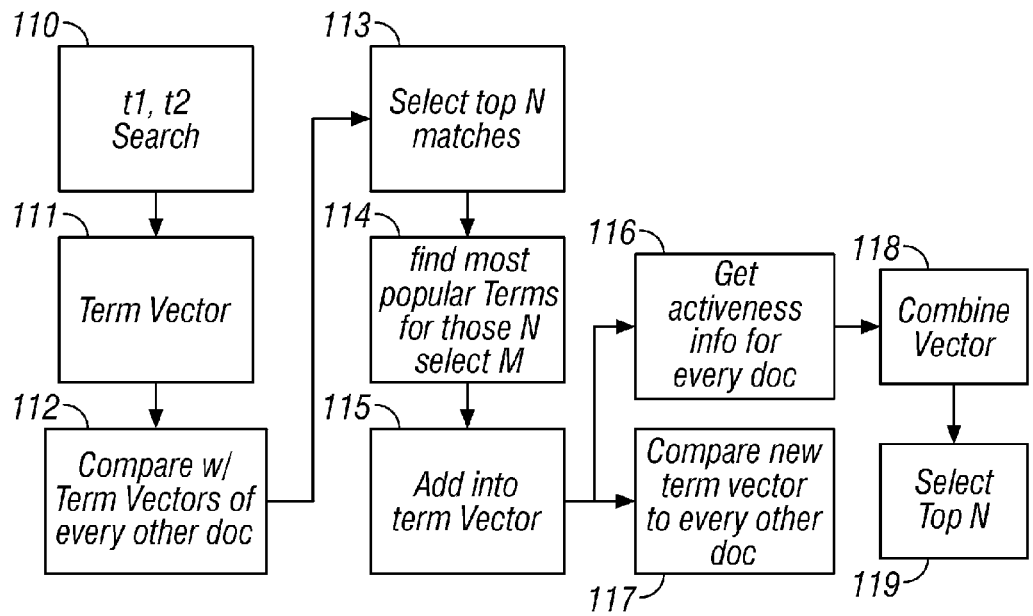
FIG. 12 is a flow diagram showing a document recommendation according to the invention.
Figure 13:
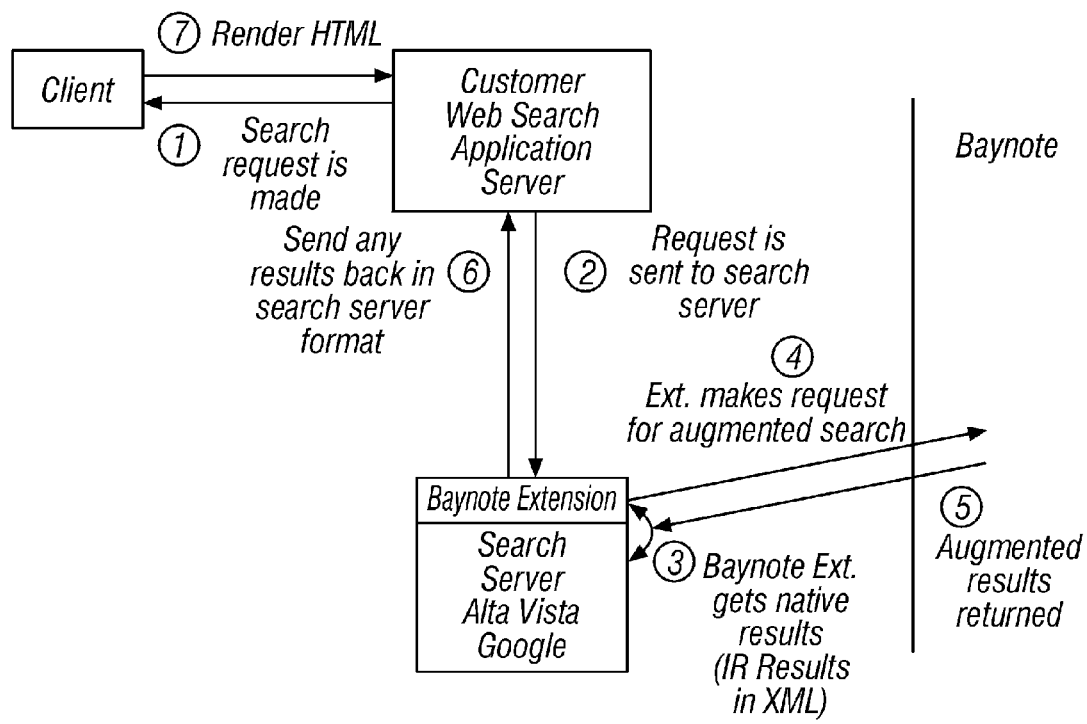
FIG. 13 is a flow diagram showing an augmented search according to the invention.

FIG. 12 is a flow diagram showing document recommendations according to the invention. At the beginning of a search 110 various term vectors T1, T2 exist, as well as a peer/expert population. A term vector is available and is compared with the term vectors of every other document such that the top N matches are selected. The most popular terms for the N most documents are found and these are added into the term vector as well. At this point, activeness information may be obtained for every document and the new term vector can be compared to the term vector of every other document. The two can then be combined 118 and the top N can then be selected 119. The concepts of term vectors and document searching are discussed in greater detail below.

The invention uses a similar strategy to the way in which a search is performed inside of a document. The known approach represents everything in a vector space model. This approach takes a document and makes a vector, which comprises all of the document terms in term space. This is done for every document. The search is represented as another vector in term space.

In this regard, the invention uses a vector space model, but the way it builds the vector to represent a document has nothing to do with what is in the document. It has to do with what other people have searched on and have hit this document. For example, an individual performs a search on the term "chip design" and perhaps other words. He might have ended up finding a document. It might have been low down on the list of returned results, but he might have ended up finding it. As soon as he does, and he finds it, the invention then associates whatever he searched on with that document, and that contributes to the vector. There are other ways to fill out the term vector, e.g., through a users navigation behaviors (described later), or through explicit input by the user. Thus, the invention builds representations of the document based on how other people are using it.

Instead of having single-term vectors for a document, which is what happens in the search space, the invention gives every individual user their own term vector for a document. Accordingly, every user gets to say what their opinion is on what a particular document is about. Some people may have no opinion on certain documents. However, if somebody has ever performed a search and used the document, for example, their opinion gets registered in their vector for that document. Knowing this, the invention allows various functions to be performed, such as "I want to match all the documents, but I don't want to look at everybody's opinion;" or "I want to look at just my peers' opinions or the experts' opinions." In this case, the invention takes several of the term vectors from different people, sums them together, gets a view of what that population thinks that document is about, and uses that result to connect people to the right documents.

Thus, this aspect of the invention provides a search enhancement that relies upon the novel technique of a usage-based topic detection. The term vector provides a vector space model to represent usage-determined topics.

Activeness. In addition to the term vector, the invention also comprises a vector that looks at what documents each user uses. Every user has one of these, called the activeness vector. Every time they use a particular document, the invention notes that they have used it. Every bucket in the activeness vector is a particular document or asset, and the bucket keeps an accumulation of usage. Some buckets may have zero. Some might have a huge number. Different actions on an asset by a user, e.g., reading or printing, contribute differently to the activeness vector. An activeness vector for a population can be generated based on the activeness vectors of each of the users in that population. For example, for a particular population, e.g. seven users, the usage vectors are summed to determine how much a particular document is used in that population. The invention combines these two pieces of information, i.e. the term vector and the activeness vector, to help recommend documents. For example, there might be a document that matches perfectly in terms of topic but is not used very much. Even though both vectors concern usage-based information, one vector concerns an amount of usage and the other vector concerns the context of usage. The invention brings these two numbers together to suggest a document. The invention can also incorporate the results from an existing search engine (which amounts to topic match based on the contents of an asset) with the term and activeness vectors if we want.

Each individual has his own library (collection of used assets) and for each document in an individual's library, the system has the user's term vector, which represents what they think the document is about. The system also has their activeness vector which indicates how much they have used that document in any context. It is now possible to bring together any given group of users and ask for their collective opinion on a document. There are also the global usage vectors, which are the sum of everybody's vectors. There are also special usage vectors, for the group of anonymous users. Everybody who is unknown all contribute to the same usage vectors. When combining vectors to create a collective view, there can be a different weight for different people's vectors, but the sum of everybody is the global vector. The invention also comprises users' peers and experts.

Peers. The way that the invention determines peers is similar to the way that peers are determined in collaborative filter applications, such as Amazon.com, but in this case the determination is based on document usage. The invention looks at two user's document usage (activeness) vectors, e.g. one person has used this document, this document, and that document; the other person has used the same three documents, therefore they're similar. That is, there is a document usage similarity that, in this case, is established when the invention compares the two user's activeness vectors. In the preferred embodiment, two users that overlap on a significant set of used assets are considered to be peers regardless of other assets used only by one user or the other. That is, the fact that one user uses a subset of what the other uses means they share a common interest or role. In this regard, the invention can also look at the actual terms that people use: do they search on similar terms? Similar documents? Similar search terms, or a blend? Thus, the invention considers term usage. Another consideration is the user's area of expertise. Consider, for the moment, that two people have expertise vectors, and that their expertise vector is a term vector as well. It is a term vector that, instead of representing a document, represents a person and what they know. It could be from a profile or it could be automatically detected based on what they use.

Expertise. What a given user knows the most about is his/her expertise. The system can automatically determine a user's expertise based on what assets they use and what topics they tend to spend time on. Expertise is validated. The invention looks at a person's collection. We ask the global population what they think those documents are about, not what the user said they were about when he searched for them, which is the user's term usage, but what the global population says these documents are about. When looking at the combination of global term vector associated with the assets in a given user's collection, a picture emerges as to what that user's expertise (which can also be represented by a term vector). A user can not self claim what he expertise is. The population of other users ultimately determines the expertise vector. To identify an expert, the system looks at the expertise vector. For example, if a user is searching on chip design, the system looks at every user's expertise vector, and finds out who is most expert on chip design. The system selects, e.g. the top 30 experts. The system then finds those 30 experts' term vectors and activeness vectors for every document, sums them together, and then performs a comparison.

An alternative and complimentary approach to the determination of user expertise first identifies those documents in the collection that have high impact factor for the given topic of interest. Asset Impact Factor is a measure of how useful an asset is to a particular population, such as the global population, for the given topic. Once the impact factor is computed for assets in the entire collection, every user's library can be assessed in terms of impact factor of included assets. Using this method, users with relatively many high impact assets in their collection of used assets are considered to be experts on the given topic. Such users may also be assigned an Expert Impact Factor, reflecting the impact of that user's asset collection on a given population for a given topic.

If the user is on a particular document, using a term vector for the document based on either the user's global population, peer population, or expert population, the user can ask what documents are similar to this e.g. ask for "More like this." The system can compare this document's vector to every other document's term vector. In this case, the invention is looking at the term vector, which is determined by a group as to the relevance of terms to a particular space. Therefore, there is a second measure on top of the term vector, which is the measure of relevance. It is therefore possible to say that this document is relevant in this space, not just that it has these words in common.

When a search is performed using the term vector and the activeness vector, the user gets the most useful documents returned to him. The system can also say that now that these documents were found, the vectors are known, and it is possible to go off and find additional documents that might be of interest and suggest those. This is a way to expand the list of search results. The context in which this happens most often is when the user is navigating around, and has found a certain page. The user opens the documents that are closest to this one. The user clicks on the document that he likes, and then says that this is close, so show me more like this. What gets returned may, in fact, have been in that original search list, but there might be some new things as well.

The system performs navigation tracking based on usage in a user-specific way. Thus, the invention can also track where people go from one document to another. A user may end up going to a particular document looking for information, but may then have to click through several documents before finding the useful documents. If one or more users follow this same pattern, the system can recommend that a user landing on the initial document go immediately to the useful document. That is, the invention makes an association between documents that are found to be useful, even where other documents may have been encountered by users along a navigation path.

Thus, the invention recommends going straight to a document useful document, without having a user navigate through documents that may normally intervene. This is based on usage: for each user there is a matrix representing connections between visited documents and the most useful documents arrived at from that location. As in other aspects of the system, we can combine user opinions to get a collective opinion, e.g., of the user's peers, experts, or the global population, in this case regarding where are the most useful places (assets) to go to from the current location. For every user, for example, we can take each of the peers' matrices and add them all together, and then come up with a recommendation. In this way, the invention keeps track of the navigation patterns of the user's peers. In addition to providing recommendations, identified navigation patterns can also be used to provide visualizations of user activity within an asset collection on a global or population-specific basis. Such visualizations or usage maps can, for example, be very informative to site designers in understanding the effectiveness of their site and understanding user interests.

One concern with a system such as that disclosed herein is that as the system starts recommending documents, it tends to reinforce their usefulness. The invention counters this using a validation technique. For example, if there is a fad that the system is reinforcing, e.g. people go to a particular document all at once, but they are not going to return, e.g. a fad movie. Everybody goes because they hear that it is good, but in fact, it is terrible and they hate it. A lot of people go to the document, but no people come back to it. The invention adjusts the usefulness of the document by looking at the percentage of people that come back, and determines if there are enough people coming back to validate it as a legitimately useful document. As for making a determination, in one embodiment if something is new and it does get a lot of attention in the beginning, the system encourages that attention, in a sense, because it may be something that is new and important. But, if over time, people do not start coming back, it is going to decay away quickly. Accordingly, the invention considers both the notion of newness and the notion of validation.

Besides connecting a user from document to document, the invention also uses navigation to find information that identifies what a document is about. When somebody clicks on a link and goes straight to a document and uses it, that tells the system that the user clicked on this link thinking he were getting something and then he used it. Whatever the link text is, it is a decent reflection about what this document is. The system then uses that link text and now that link text also contributes to the term vector. It is as if the link is a substitute for a query and, in fact, if the user has clicked on, e.g. ten links going all the way through this document, the system uses the link text, with some weighting because not every link has the same weight. It depends on how close the link is to the document. If the user clicked on one word in a document and clicked on another link, then another link in the next document, the most recent link gets the most weight, and earlier links get less weight. Thus, in this embodiment weighting is based on a form of proximity.

Another aspect of navigation addressed by the invention concerns where a user starts with a particular document, e.g. document 1, and the system makes various recommendations based on this starting point. In the event the user was first on a different document, e.g. document 13, than on document 1, the system may recommend a different set of documents. In this case, the invention employs an additive model which look sat the documents that the system recommends from, e.g. document 13 and looks at the documents it recommends from document 1, and the system weights them together. In this way the system may use the user's navigation trail (encompassing one or more navigation points) to suggest the best location to go next. The person skilled in the art will appreciate that there are so many options available for processing the systems vector information One aspect of the invention concerns determining what is a successfully used document. One approach looks at how much time has somebody spent on the document. There are two concepts related to this: One is the idea of document processing time. What we would like to be able to infer is how much time somebody is actually spending looking at and reading this document. This is in contrast to not reading the document at all, where it just might be on the screen, but the user is not looking at it; or the user is seeking for something, searching, but not finding it. Document processing time is the simplest measure of successful use because the system only need look at how much time somebody's on a document. Another consideration is that seeking time is not the same thing as processing time. In this case, the user is scrolling around and not finding what they want, i.e. they are not processing it. The system can take the time spent on the document, subtracting out the time that the user is scrolling on the document. The system can also use scrolling as an indication that the user is actually on the document. The system can apply a combination of scrolling and pausing and use that to get a sense of how long the user is actually processing the document. So, if somebody scrolls, then they stop, and they sit there for 30 seconds, then they start scrolling again, the system can make a guess that the user was reading that document for 30 seconds. Any mistake in the guess is an aggregate because the system rarely looks at just one person's opinion, but is summing this information over a group of users.

The term vector is a big vector of every possible term. In the presently preferred embodiment, the system increments a term's vector entry each time the term is associated with a document through user behavior. Terms that are not associated with a document get a zero. On top of this, terms that are associated through usage with many documents get less of a weight in the term vector because they are very common. Thus, the system looks at all the terms that are known and looks at how many documents those terms are associated with. Terms that are associated with many documents have a count for the number of documents that the term is associated with. The system applies a formula to lower the term's rating based on its association with many documents. If there is a word that is in every single document in a collection, then it's rating is equivalently a zero. Certain words, such as "the" and "and" are standard stop words and are removed from a search before they even get to the system analytics.

Thus, the system commences with the creation of the initial term vector based on a data structure. For every user in the system, there is a matrix of documents and associated terms referred to as a term doc matrix. This is the collection of a user's term vectors for each document known to the system. In other words, every user has a term doc matrix that represents for each document, what that user thinks the document is about. For example, one person thinks a document is about oil and about refineries, but not about something else. The system services a particular population that is already selected, which can comprise for example peers or experts, e.g. the person's top 30 peers. To perform a comparison, the system knows of these 30 users, and each of these users has a weight based on how much of a peer they are to a current user. The peer with the greatest weight is the top peer, the peer with the next greatest weight is the next best peer, on so on. The invention looks at all of the term doc matrices of these peers and adds them together given the weightings based on their peer scores, and produces therefrom a single term doc matrix which is this population's opinion on every document in the system. The system then takes this matrix and calculates a cosine between a term vector representing a query or current context and each of the rows in the matrix, which represent term vectors for each document. The result of the cosine calculation represents how closely a document matches the context according to the user's peers.

Once the system has determined all of the term vectors in the population and assigned numbers to each document, the system then selects the top documents. One way to do this is to select the top ten document and then sum them together to get a single vector which says in the aggregate that these documents are bout a certain topic. Then, the system takes out those search terms that are already used and looks at where the other peaks are. Those are additional terms that the system either wants to suggest or automatically enter to the core. Now there a new term vector, and the system goes through the same process. The system then can match this new term vector with every other document, get a new set of scores, and select the top ten of those documents. The system has a matrix that has everybody's opinion on what these documents are about. The system can now compare this new term factor and get a new set of scores for all of them. The system also goes and we get a single vector for each document which indicates how related this document is to the topic with another score, which is how useful this document is.

Once the system has determined all of the term vectors in the population and assigned numbers to each document, the system then selects the top documents. One way to do this is to select the top ten document and then sum them together to get a single vector which says in the aggregate that these documents are bout a certain topic. Then, the system takes out those search terms that are already used and looks at where the other peaks are. Those are additional terms that the system either wants to suggest or automatically enter to the core. Now there a new term vector, and the system goes through the same process. The system then can match this new term vector with every other document, get a new set of scores, and select the top ten of those documents. The system has a matrix that has everybody's opinion on what these documents are about. The system can now compare this new term factor and get a new set of scores for all of them,. The system also goes and we get a single vector for each document which indicates how related this document is to the topic with another score, which is how useful this document is.

Consider an extremely popular document, a very unpopular document, a somewhat popular document, and a document that has never been used. Every user has a document vector or their activeness vector, which identifies what documents that have been used. Each user also has an associated weight based on the peer population. Given these two numbers for every document, i.e. how well it matches and how popular it is, the system combines the two to produce a score. One way to combine them is to calculate a weighted sum. Another way is to take the numbers as is, but anything that is below a threshold is removed. In the first approach, when the system adds them together the orderings of the documents is changed; in the second approach, the ordering that gets preserved as the ordering of relevance, but the system is removing things that do not meet a certain threshold of accuracy. In another approach, instead of a straight combination, apply a transform which tends to favor more balanced numbers than it favors extremes. A straight linear combination favors extremes but, for example, a square root combination can produce a more balanced result. Once the system has combined the vector, there is a ranking, and the system can recommend, e.g. the top 10 documents. Once the documents are returned to the user, the next part is watching what the user does with the documents. For example, the system looks at such actions is the user navigating in a certain way, staying a certain amount of time on a document, where are the links going. The system collects that information to learn about the usefulness of a document. The user starts by doing a search on a topic, e.g. oil. The system responds by recommending certain documents. The user clicked on one and printed it. In the user's term doc matrix, the system adds a number for that document connected with those words. If somebody else does a search and the term doc is involved, the matrix indicates that the document is relevant for a certain purpose according to a certain person. Thus, if the person is a close peer and the document is a relevant document, the term match is good, and the document is recommended. If the user is not a close peer or the document does not have a good term match, or the document is not very active, then it is not recommended.

As discussed above, there are two vectors, which express usage-based relevance and activeness. There is also a third vector that could be produced when the two vectors are combined with search engine results. Thus, these three things are combined into this vector. There are many ways they can be combined to determine how much to weight the search results from the search engine versus how much to weight the other results. One approach is to obtain a list of IR results and, from that list, remove everything whose accurateness is below a certain threshold. This produces an augmented search, where the search is augmented by removing the less accurate results.

Another approach involves separate vectors related to peers, experts, and the global population, which are then combined with different weightings, e.g. the experts get the greatest weighting, the weighting could be profile-based, or it could be based on user responses to a series of questions.

As discussed above, every user has a term doc matrix that captures what the user thinks every document is about, and they have an activeness vector that expresses how much the user has used these documents. This activeness vector is not only used through search. It could be used through navigation and is built up based on search terms or link terms. To determine peers and experts proceeds as follows:

For a given user, build a picture of what that user's expertise is. Validate that expertise by the global population or by the appropriate peer group. In the first case, the global population has a term doc matrix which represents what the global population's opinion is about every document. This is essentially a sum of every single user's equally weighted opinions on the document. This is a global opinion. For each user, look at what documents that user has used, and that they have used them a certain amount. This step involves determining the expertise of this user. For example, this user has used document one at a weight of, e.g. four, so when the system goes into document one it determines what the global population think this document is about. Take that, multiply it by four, and add it to the user's expertise vector.

If the global population thinks that is an important document and if the user has used it a lot, the user has more expertise, The system does that for every document in this user's collection. The things the user has used the most get the most weight in terms of their expertise. Each time the system adds what the global population thinks about the documents that the user has used. Thus, expertise is a measure of what expertise the user's collection represents. The system does not know what a user's actual expertise is. It could be somebody who has done an excellent job of collecting all the right documents on this topic, but if he's done that, in a sense, he serves the purpose as an expert. That is, if the user has all the good documents on that topic, therefore that collection is an expert collection. The amount of weighting to give the popularity of documents is an issue. An amount of weight is given to how used a document was by this user and an amount of weight is given to how popular the document was in the population. The system combines these numbers and recalculates expertise, every night for example. Thus, the system recalculates everybody's area of expertise because it might change on some basis, e.g. a daily or monthly. The system goes through and calculates everybody's area of expertise, and then if it is desired to figure out who the experts are, given a particular query, the system takes that query vector and compares this query vector to every user's expertise vector. Then, the system can produce the top N of experts, and that is the expert population. Another case occurs where the system does not have a query and has a document but the user wants to know who the experts are. In this case, the system can use the document itself to determine who the experts are. Thus, the document itself has a vector, and the system can compare the vector of this document to the expertise vector of everybody and, given the topic of this document, determine who the experts are on this topic represented by this document.

Peers. Every user has a term doc matrix and an activeness vector. There are three things that the system can look at and combine to determine peer-hood. One is to compare what the peer value is for, e.g. two users. The system makes this determination for everybody, but for now focus on two users. Look at one user's activeness vector and another user's activeness vector, and look at how similar they are. Two people that use similar documents a similar amount are similar, looking in the same places and at relatively proportional amounts. In this case, there is a similarity metric between one user's activeness vector and another user's activeness vector. Another way of determining peers is to look at what topics they are interested in. To do that, sum their term doc matrix, which gives a sense of what topics they have searched on and used in the past. The sum represents what this person is interested in, and is referred to as an interest vector. The system compares interest vectors. Thirdly, the system can compare the computed expertise vectors of each user to determine peers. Alternatively, the system could employ combinations of these approaches. Because the user has a particular subject in mind and the user has a certain number, the peers are weighted according to how closely they match that particular person. Some peers may have a closer number to the user's number. Some are going to have one that is smaller or larger, depending on what notation the system is using. In the end, there is a number that indicates how much like this person the user is. The user might want a peer group of 30, then number 30 in the group might have a smaller weight, and number 1 in the group might have a greater weight, and everybody's in between have a weight between. The system could also have a threshold that does not create any peers less than the threshold.

FIG. 12 is a flow diagram showing an augmented search according to the invention. In an augmented search, a search request is made by a client of customer libraries. The search is sent to the search server and the extension makes a request for augmented information, for example from Google. The augmented results are returned to the server and the results received are added to the server information which are then sent back to the search server in search server format. The customer then receives the rendered HTML of the search.

Time-based Usefulness

As mentioned elsewhere in this application, every aspect of the system adapts and evolves over time as new observations are made, new log files are processed, and new patterns emerge. One aspect of this adaptation involves giving precedence to usage patterns that occur more recently over those that occur in the past. In the preferred implementation of the system, recency bias is accomplished through decaying past usage patterns based on a time decay function. Activeness vectors, for example, might decay at a rate of 0.01% per day, such that activity that occurred in the past has less of an influence on the activeness vector than more recent usage. Similarly, term vectors can be set to decay at a specified rate, such that term to asset associations are biased toward more recent usage patterns. In this way, the usefulness of assets can be computed in a time-sensitive manner.

Assets that were useful in the past are not necessarily useful in the present. All information stored within the system, including peer scores and expertise scores, can be set to time decay in a similar fashion. Regarding activeness vectors, assets that are very new or newly rediscovered may need a boost above and beyond recency bias to enable their discovery by the population prior to strong usage patterns having had an opportunity to emerge. Thus, very new assets, defined as those assets whose very recent activity makes up a large proportion of their total activity over all time, may be given an additional newness bias. It is also possible for an administrator to assign a newness bias explicitly to certain assets or a collection of assets. This newness bias makes very new assets appear more active than they are in reality for a short period of time. It is also possible to identify periodic usage of assets and give activeness biases to assets as they reemerge at specific times of year, for example.

Usage-based Evaluation of Terms and Phrases

This aspect of the invention relates to relationships amongst terms and amongst terms and phrases that the system infers based on captured usage data. First, a term affinity (similarity) matrix can be constructed that relates terms and phrases to one another. Terms and phrases with high affinities for one another are considered to be aspects of a single topic and may even be synonyms for one another. The term affinity matrix can be constructed based on the frequency of co-occurrence of terms in users' queries or used links, or by the frequency of co-occurrence of terms in assets' term vectors, for example. This matrix, in combination with linguistic characteristics of the terms and phrases themselves, can be used to identify synonyms, acronyms, and atomic phrases automatically. Atomic phrases are ordered sets of two or more words whose frequent occurrence together indicate that they should be considered a single multi-word phrase rather than multiple independent words. The term affinity matrix in combination with navigational usage patterns and assets' term vectors can even be used to detect terms and phrases that are sub-topics of other terms and phrases. Because all such identified relationships between terms/phrases and automatic detection of synonyms, acronyms, and atomic phrases are based on usage by a community of users, identified relationships are inherently tailored to a specific community.

Target Applications for the Invention

In addition to the foregoing discussion, the invention is also useful in marketing lead generation for business Web sites, sales and channel partner extranets, customer support sites, vertical healthcare applications such as physician portals and patient research sites; vertical government applications such as citizen portals; and financial services and insurance vertical applications such as agent and advisor portals.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for automatically determining, in an on-line community, any of importance of an on-line asset, topic of said asset, a user's current context/topic of interest, and relationships among users, without asking said on-line community's members directly, comprising the processor executed steps of:

observing individual and community usage by a community of peers and experts;

employing automatic techniques to extract patterns from said usage;

identifying usefulness of an online asset by observing user implicit behaviors in connection with said usage patterns of said online asset and by extracting behavioral patterns from said observations;

refining said identified online asset usefulness by context, wherein the context of each online asset is automatically detected based on observed terms/topics from individual and group user behaviors when said online asset is determined to be useful based upon said individual and group user behaviors;

determining a user's current context/topic based on an aggregation of the identified context of each online asset that the said user has found useful during their navigation, where an asset's contribution to the aggregate context is weighted by an asset's recency of use;

refining said identified user context based on searches performed during the user's navigation, where a search's contribution to the aggregate context is weighted by the recency of the search;

comparing the identified context of the current user with previously identified contexts of other users and assigning to each user a similarity score based on its similarity to the current user's context;

and using said similarity score to automatically determine each user's peer group;

said observed usage patterns comprising user online search, navigation, and interaction behavior, said behavior including any of searches performed and position in user trail, assets viewed and position in user trail, dwell, range, scrolling, think time, and mouse movement on an asset, anchors and lines used in asset text, virtual bookmarks and virtual printing, and explicit downloading, emailing, printing, saving, and removing to and/or from a computer hardware memory.

2. The method of claim 1, further comprising the step of: determining similarity between users based on a combination of shared use of assets inverse weighted by overall asset popularity, shared areas of expertise as determined by observing individual and community usage patterns, and shared use of search terms.

3. The method of claim 1, further comprising the step of: representing asset use, expertise, and term usage in vector-space and compared using an asymmetric similarity metric, said metric optionally comprising a dot product.

4. The method of claim 1, further comprising the step of: classifying usage of a given asset by a given user as successful or unsuccessful use based on a combination of factors comprising any of time spent on an asset, explicit user actions taken on said asset, said actions comprising any of print, save, email, and bookmark, mouse and keyboard behavior, length and distribution of stable pauses between activity, navigation to and from said asset, and browser window state, said state comprising any of foreground, background, minimized, maximized, and closed.

5. The method of claim 1, further comprising the step of: providing a significantly greater weighting to the importance of implicit observations over the weighting provided to explicit observations.

6. The method of claim 1, further comprising the steps of: analyzing all observations; and via said analysis, generating a set of recommendations comprising distilled experiences from a community of users;

wherein said recommendations age over time and are discarded if they have relatively little value; and wherein recommendations which are most valuable based on repeated usage are stored into a long term memory.

7. The method of claim 1, further comprising the step of: for a given user who may be anonymous, said user visiting a particular site, and a given context comprising any of what page the user is on and how the user got there, providing recommendations to said user that allow said user to navigate said site more efficiently.

8. The method of claim 1, further comprising the steps of: generating a set a recommendations that may be applied to a search; and for a given user who may be anonymous, and a given search query, using said recommendations to refine and augment a resulting search.

9. The method of claim 6, further comprising the step of: driving said recommendations not just by individual uses, but by the use of communities, leveraging the wisdom of crowds and community emergent behavior.

10. The method of claim 1, further comprising the step of: identifying communities comprising any of peer groups and expert groups based on an information context;

wherein communities are nested and defined by different levels of contexts.

11. An apparatus for automatically determining, in an on-line community, any of importance of an on-line asset, a user's current context/topic, and relationships among user without asking said on-line community's members directly, comprising:

means for observing individual and community usage by a community of peers and experts;

a processor for employing automatic techniques to extract patterns from said usage;

said processor identifying usefulness of an online asset by observing user implicit behaviors in connection with said usage patterns of said online asset and by extracting behavioral patterns from said observations;

said processor refining said identified online asset usefulness by context, wherein the context of each online asset is automatically detected based on observed terms/topics from individual and group user behaviors when said online asset is determined to be useful based upon said individual and group user behaviors;

said processor determining a user's current context/topic based on an aggregation of the identified context of each online asset that the said user has found useful during their navigation, where an asset's contribution to the aggregate context is weighted by an asset's recency of use;

said processor refining said identified user context based on searches performed during the user's navigation, where a search's contribution to the aggregate context is weighted by the recency of the search;

said processor comparing the identified context of the current user with previously identified contexts of other users and assigning to each user a similarity score based on its similarity to the current user's context; and said processor using said similarity score observed usage patterns to automatically determine each user's peer group;

said observed usage patterns comprising user online search, navigation, and interaction behavior, said behavior including any of searches performed and position in user trail, assets viewed and position in user trail, dwell, range, scrolling, think time, and mouse movement on an asset, anchors and lines used in asset text, virtual bookmarks and virtual printing, and explicit downloading, emailing, printing, saving, and removing.

12. The apparatus of claim 11, further comprising:
said processor determining similarity between users based on a combination of shared use of assets inverse weighted by overall asset popularity, shared areas of expertise as determined by observing individual and community usage patterns, and shared use of search terms.

13. The apparatus of claim 11, further comprising:
said processor representing asset use, expertise, and term usage in vector-space and compared using an asymmetric similarity metric, said metric optionally comprising a dot product.

14. The apparatus of claim 11, further comprising:
said processor for classifying usage of a given asset by a given user as successful or unsuccessful use based on a combination of factors comprising any of time spent on an asset, explicit user actions taken on said asset, said actions comprising any of print, save, email, and bookmark, mouse and keyboard behavior, length and distribution of stable pauses between activity, navigation to and from said asset, and browser window state, said state comprising any of foreground, background, minimized, maximized, and closed.

15. The apparatus of claim 11, further comprising:
said processor providing a significantly greater weighting to the importance of implicit observations over the weighting provided to explicit observations.

16. The apparatus of claim 11, further comprising:
said processor analyzing all observations; and
via said analysis, said processor generating a set of recommendations comprising distilled experiences from a community of users;
wherein said recommendations age over time and are discarded if they have relatively little value; and
wherein recommendations which are most valuable based on repeated usage are stored into a long term memory.

17. The apparatus of claim 11, further comprising:
for a given user who may be anonymous, said user visiting a particular site, and a given context comprising any of what page the user is on and how the user got there, said processor providing recommendations to said user that allow said user to navigate said site more efficiently.

18. The apparatus of claim 11, further comprising:
said processor generating a set a recommendations that may be applied to a search; and
for a given user who may be anonymous, and a given search query, said processor using said recommendations to refine and augment a resulting search.

19. The apparatus of claim 18, further comprising:
said processor driving said recommendations not just by individual uses, but by the use of communities, leveraging the wisdom of crowds and community emergent behavior.

20. The apparatus of claim 19, further comprising:
said processor identifying communities comprising any of peer groups and expert groups based on an information context;
wherein communities are nested and defined by different levels of contexts.

* * * * *